(12) United States Patent
Siddiqui

(10) Patent No.: US 10,641,318 B2
(45) Date of Patent: May 5, 2020

(54) HINGED DEVICE

(71) Applicant: Microsoft Technology Licensing, LLC, Redmond, WA (US)

(72) Inventor: Kabir Siddiqui, Sammamish, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 435 days.

(21) Appl. No.: 15/373,966

(22) Filed: Dec. 9, 2016

(65) Prior Publication Data
US 2018/0166842 A1 Jun. 14, 2018

(51) Int. Cl.
*F16C 11/04* (2006.01)
*G06F 1/16* (2006.01)
*H01R 35/00* (2006.01)

(52) U.S. Cl.
CPC ............ *F16C 11/04* (2013.01); *G06F 1/1616* (2013.01); *G06F 1/1681* (2013.01); *F16C 2370/00* (2013.01); *H01R 35/00* (2013.01); *Y10T 16/541* (2015.01)

(58) Field of Classification Search
CPC .... G06F 1/1681; G06F 1/1616; G06F 1/1652; E05D 3/06; E05D 3/12; E05D 3/18; E05D 3/122; E05D 11/08; E05D 11/10; E05Y 2900/606; Y10T 16/547; Y10T 16/541; Y10T 16/5387; Y10T 16/54038; H05K 5/0226; H04M 1/022; F16C 11/04; F16C 2370/00; H01R 35/00
USPC ............. 16/354, 366, 303, 342; 379/433.13; 361/679.27; 455/575.3
See application file for complete search history.

(56) References Cited

U.S. PATENT DOCUMENTS

| | | | |
|---|---|---|---|
| 2,040,279 | A | 5/1936 | Joseph |
| 3,289,877 | A | 12/1966 | Wolf |
| 4,493,316 | A | 1/1985 | Reed |
| 4,617,699 | A | 10/1986 | Nakamura |
| 4,718,127 | A | 1/1988 | Rittmann et al. |
| 4,753,331 | A | 6/1988 | Dietenberger et al. |

(Continued)

FOREIGN PATENT DOCUMENTS

| CN | 1180516 A | 12/2004 |
|---|---|---|
| CN | 103291737 A | 9/2013 |

(Continued)

OTHER PUBLICATIONS

"Double geared hinge", retrieved at <<http://www.wamungo.com/PrintModel/Detail/Double-geared-hinge-5305a74589702816c05dlab5>>, on Mar. 10, 2017, 6 pages.

(Continued)

*Primary Examiner* — William L Miller
(74) *Attorney, Agent, or Firm* — Rainier Patents, P.S.

(57) ABSTRACT

The description relates to hinged devices, such as hinged computing devices. One example can include a first portion and a second portion. The example can also include a communication member spanning between the first and second portions and defining first and second parallel hinge pins. The first hinge pin can include a first cam follower that is received in a first multi-lobe cam of the first portion that forces the first portion away from the first hinge pin when the first and second portions are oriented at non-parallel orientations and allows the first portion to be biased toward the second hinge pin at parallel orientations.

20 Claims, 18 Drawing Sheets

(56) References Cited

U.S. PATENT DOCUMENTS

| | | | |
|---|---|---|---|
| 4,845,809 A | 7/1989 | Pillifant, Jr. | |
| 4,949,427 A | 8/1990 | Keller | |
| 4,976,007 A | 12/1990 | Lam | |
| 4,986,763 A | 1/1991 | Boyle | |
| 4,996,739 A | 3/1991 | Baer | |
| 5,041,818 A | 8/1991 | Liu | |
| 5,173,686 A | 12/1992 | Fujihara | |
| 5,229,921 A | 7/1993 | Bohmer | |
| 5,448,799 A | 9/1995 | Stein, Jr. | |
| 5,509,590 A | 4/1996 | Medeiros et al. | |
| 5,566,048 A | 10/1996 | Esterberg | |
| 5,606,774 A | 3/1997 | Wu | |
| 5,640,690 A | 6/1997 | Kudma | |
| 5,666,694 A | 9/1997 | Slow et al. | |
| 5,796,576 A | 8/1998 | Kim | |
| 5,987,704 A | 11/1999 | Tan | |
| 5,995,373 A | 11/1999 | Nagai | |
| 6,108,868 A | 8/2000 | Lin | |
| 6,223,393 B1 | 5/2001 | Knopf | |
| 6,301,489 B1 | 10/2001 | Winstead | |
| 6,416,027 B1 | 7/2002 | Hart | |
| 6,421,235 B2 | 7/2002 | Ditzik | |
| 6,577,496 B1 | 6/2003 | Gioscia et al. | |
| 6,628,244 B1 | 9/2003 | Hirosawa | |
| 6,766,561 B1 | 7/2004 | Cheng | |
| 6,778,381 B1 | 8/2004 | Bolognia et al. | |
| 6,813,143 B2 | 11/2004 | Makela | |
| 6,925,684 B2 | 8/2005 | Kang | |
| 7,058,433 B2 | 6/2006 | Carpenter | |
| 7,127,776 B2 | 10/2006 | Park | |
| 7,155,266 B2 | 12/2006 | Stefansen | |
| 7,266,864 B2 | 9/2007 | Kim | |
| 7,293,380 B2 | 11/2007 | Repecki | |
| 7,328,481 B2 | 2/2008 | Barnett | |
| 7,345,872 B2 | 3/2008 | Wang | |
| 7,380,312 B2 | 6/2008 | Ge et al. | |
| 7,407,202 B2 | 8/2008 | Ye et al. | |
| 7,414,834 B2 | 8/2008 | Ukonaho et al. | |
| 7,418,766 B2 | 9/2008 | Nelson et al. | |
| 7,436,674 B2 | 10/2008 | Barsun et al. | |
| 7,515,406 B2 | 4/2009 | Kee | |
| 7,515,707 B2 | 4/2009 | Ka et al. | |
| 7,584,524 B2 | 9/2009 | Hung | |
| 7,596,358 B2 | 9/2009 | Takagi | |
| 7,596,395 B2 | 9/2009 | Gartrell | |
| 7,636,985 B2 | 12/2009 | Greenbank | |
| 7,753,331 B2 | 7/2010 | Tang | |
| 7,758,082 B2 | 7/2010 | Weigel et al. | |
| 7,832,056 B2 | 11/2010 | Kuwajima et al. | |
| 7,900,323 B2 | 3/2011 | Lin | |
| 7,936,559 B2 | 5/2011 | Chen | |
| 7,966,694 B2 | 6/2011 | Estlander | |
| 7,966,698 B2 | 6/2011 | Barnett | |
| 8,032,988 B2 | 10/2011 | Lai et al. | |
| 8,050,021 B2 | 11/2011 | Grady et al. | |
| 8,122,970 B2 | 2/2012 | Palen | |
| 8,170,630 B2 | 5/2012 | Murayama et al. | |
| 8,405,978 B2 | 3/2013 | Okutsu | |
| 8,441,791 B2 | 5/2013 | Bohn et al. | |
| 8,451,601 B2 | 5/2013 | Bohn et al. | |
| 8,474,101 B2 | 7/2013 | Wang et al. | |
| 8,498,100 B1 | 7/2013 | Whit et al. | |
| 8,522,401 B2 | 9/2013 | Jin | |
| 8,578,561 B2 | 11/2013 | Chuang | |
| 8,615,848 B2 | 12/2013 | Mitsui | |
| 8,624,844 B2 | 1/2014 | Behar et al. | |
| 8,638,546 B2 | 1/2014 | Hoshino | |
| 8,649,166 B2 | 2/2014 | Wu et al. | |
| 8,665,382 B1 | 3/2014 | Sugimoto et al. | |
| 8,687,354 B2 | 4/2014 | Uchiyama et al. | |
| 8,713,759 B2 | 5/2014 | Cai | |
| 8,776,319 B1 | 7/2014 | Chang et al. | |
| 8,780,570 B2 | 7/2014 | Bohn et al. | |
| 8,787,016 B2 | 7/2014 | Rothkopf et al. | |
| 8,804,324 B2 | 8/2014 | Bohn et al. | |
| 8,826,495 B2 | 9/2014 | Jauvtis et al. | |
| 8,833,554 B2 | 9/2014 | Busri | |
| 8,854,834 B2 | 10/2014 | O'Connor et al. | |
| 8,855,726 B2 | 10/2014 | Ozawa | |
| 8,875,349 B2 | 11/2014 | Hanigan | |
| 8,908,364 B2 | 12/2014 | Tseng et al. | |
| 8,908,365 B2 | 12/2014 | Walters et al. | |
| 8,923,934 B2 | 12/2014 | Chol et al. | |
| 8,938,856 B1 * | 1/2015 | Shin | E05D 3/06 16/366 |
| 8,959,714 B2 | 2/2015 | Hsu | |
| 8,971,029 B2 | 3/2015 | Wong et al. | |
| 8,978,206 B2 | 3/2015 | Hsu et al. | |
| 8,982,542 B2 | 3/2015 | Bohn | |
| 8,988,876 B2 | 3/2015 | Corbin | |
| 9,003,607 B1 | 4/2015 | Hsu | |
| 9,009,919 B1 | 4/2015 | Chiang | |
| 9,013,867 B2 | 4/2015 | Becze | |
| 9,014,381 B2 | 4/2015 | Quan et al. | |
| 9,069,531 B2 | 6/2015 | Bohn et al. | |
| 9,103,147 B1 | 8/2015 | Chuang | |
| 9,104,381 B2 | 8/2015 | Kuramochi | |
| 9,122,455 B2 | 9/2015 | Meyers | |
| 9,185,815 B2 | 11/2015 | Hsu | |
| 9,201,464 B2 | 12/2015 | Uchiyama et al. | |
| 9,243,432 B2 | 1/2016 | Lee | |
| 9,290,976 B1 | 3/2016 | Horng | |
| 9,310,850 B2 | 4/2016 | Hsu | |
| 9,317,243 B2 | 4/2016 | Becze | |
| 9,348,450 B1 | 5/2016 | Kim | |
| 9,371,676 B2 | 6/2016 | Rittenhouse | |
| 9,411,365 B1 | 8/2016 | Tanner | |
| 9,417,663 B2 | 8/2016 | Kinoshita et al. | |
| 9,430,000 B2 | 8/2016 | Hood, III et al. | |
| 9,500,013 B2 | 11/2016 | Senatori | |
| 9,507,388 B1 | 11/2016 | Hampton et al. | |
| 9,513,672 B2 | 12/2016 | Garelli et al. | |
| 9,523,226 B1 | 12/2016 | Lam et al. | |
| 9,524,000 B2 | 12/2016 | Hsu et al. | |
| 9,569,002 B2 | 2/2017 | Walker | |
| 9,600,036 B2 | 3/2017 | Uchiyama et al. | |
| 9,624,703 B1 | 4/2017 | Lin | |
| 9,625,947 B2 | 4/2017 | Lee et al. | |
| 9,625,953 B2 | 4/2017 | Bitz et al. | |
| 9,625,954 B2 | 4/2017 | Campbell et al. | |
| 9,684,343 B2 | 6/2017 | Tazbaz | |
| 9,714,533 B2 | 7/2017 | Kuramochi | |
| 10,227,808 B2 * | 3/2019 | Siddiqui | E05F 3/20 |
| 10,241,548 B2 * | 3/2019 | Tazbaz | G06F 1/1681 |
| 10,253,804 B2 * | 4/2019 | Park | F16C 11/04 |
| 2002/0147026 A1 | 10/2002 | Hsieh | |
| 2003/0179880 A1 | 9/2003 | Pan et al. | |
| 2004/0091101 A1 | 5/2004 | Park | |
| 2004/0212956 A1 | 10/2004 | Kuivas et al. | |
| 2004/0226138 A1 | 11/2004 | Harmon et al. | |
| 2004/0266239 A1 | 12/2004 | Kurokawa | |
| 2005/0018393 A1 | 1/2005 | Kuo | |
| 2005/0122671 A1 | 6/2005 | Homer | |
| 2005/0148375 A1 | 7/2005 | DeLine | |
| 2005/0155182 A1 | 7/2005 | Han et al. | |
| 2005/0239520 A1 | 10/2005 | Stefansen | |
| 2006/0005356 A1 | 1/2006 | Amano et al. | |
| 2006/0007648 A1 | 1/2006 | Wang | |
| 2006/0046792 A1 | 3/2006 | Hassemer et al. | |
| 2006/0059659 A1 | 3/2006 | Kim | |
| 2006/0133052 A1 | 6/2006 | Harmon et al. | |
| 2006/0179612 A1 | 8/2006 | Oshima et al. | |
| 2007/0101541 A1 | 5/2007 | Yin et al. | |
| 2007/0117600 A1 | 5/2007 | Robertson et al. | |
| 2008/0112113 A1 | 5/2008 | Sawadski et al. | |
| 2008/0174089 A1 | 7/2008 | Ekberg | |
| 2008/0184530 A1 | 8/2008 | Chao | |
| 2008/0239672 A1 | 10/2008 | Ghoshal | |
| 2008/0250604 A1 | 10/2008 | Chen et al. | |
| 2009/0070961 A1 | 3/2009 | Chung et al. | |
| 2009/0104949 A1 | 4/2009 | Sato et al. | |
| 2009/0291719 A1 | 11/2009 | Christensen | |
| 2010/0205777 A1 | 8/2010 | Kim | |
| 2010/0207844 A1 | 8/2010 | Manning | |

(56) References Cited

U.S. PATENT DOCUMENTS

| | | |
|---|---|---|
| 2010/0232100 A1 | 9/2010 | Fukuma et al. |
| 2010/0328250 A1 | 12/2010 | Gorsica et al. |
| 2011/0099756 A1 | 5/2011 | Chen |
| 2011/0115713 A1 | 5/2011 | Altman |
| 2011/0128216 A1 | 6/2011 | Renwick |
| 2011/0177850 A1 | 7/2011 | Griffin et al. |
| 2011/0205695 A1 | 8/2011 | Hassemer et al. |
| 2011/0292605 A1 | 12/2011 | Chen et al. |
| 2012/0002360 A1 | 1/2012 | Seo et al. |
| 2012/0037047 A1 | 2/2012 | Moldovan |
| 2012/0046076 A1 | 2/2012 | Masser et al. |
| 2012/0120618 A1 | 5/2012 | Bohn |
| 2012/0120627 A1 | 5/2012 | O'Connor et al. |
| 2012/0127471 A1 | 5/2012 | Urushidani |
| 2012/0137471 A1 | 6/2012 | Kujala |
| 2012/0162866 A1 | 6/2012 | Bohn et al. |
| 2012/0170243 A1 | 7/2012 | Griffin et al. |
| 2012/0206864 A1 | 8/2012 | Bohn et al. |
| 2012/0206893 A1 | 8/2012 | Bohn et al. |
| 2012/0257368 A1 | 10/2012 | Bohn et al. |
| 2012/0307472 A1 | 12/2012 | Bohn et al. |
| 2012/0314399 A1 | 12/2012 | Bohn |
| 2012/0314400 A1 | 12/2012 | Bohn et al. |
| 2013/0010405 A1 | 1/2013 | Rothkopf et al. |
| 2013/0016489 A1 | 1/2013 | Yeh et al. |
| 2013/0016492 A1 | 1/2013 | Wang et al. |
| 2013/0046492 A1 | 2/2013 | Westergaard |
| 2013/0111704 A1 | 5/2013 | Mitsui |
| 2013/0135809 A1 | 5/2013 | Uchiyama et al. |
| 2013/0139355 A1 | 6/2013 | Lee |
| 2013/0152342 A1 | 6/2013 | Ahn |
| 2013/0318746 A1 | 12/2013 | Kuramochi |
| 2013/0322004 A1 | 12/2013 | Park |
| 2013/0342094 A1 | 12/2013 | Walters et al. |
| 2014/0042293 A1 | 2/2014 | Mok et al. |
| 2014/0126133 A1 | 5/2014 | Griffin et al. |
| 2014/0129739 A1 | 5/2014 | King |
| 2014/0174227 A1 | 6/2014 | Hsu et al. |
| 2014/0185215 A1 | 7/2014 | Whitt et al. |
| 2014/0185220 A1 | 7/2014 | Whitt et al. |
| 2014/0196253 A1 | 7/2014 | Song et al. |
| 2014/0217875 A1 | 8/2014 | Park et al. |
| 2014/0246354 A1 | 9/2014 | Probst et al. |
| 2014/0265295 A1 | 9/2014 | Rhyner et al. |
| 2014/0287804 A1 | 9/2014 | Bohn et al. |
| 2014/0290008 A1 | 10/2014 | Hsu |
| 2014/0290009 A1 | 10/2014 | Kasai et al. |
| 2014/0293534 A1 | 10/2014 | Siddiqui |
| 2014/0360296 A1 | 12/2014 | Hsu |
| 2014/0362507 A1 | 12/2014 | Kinoshita et al. |
| 2014/0373338 A1 | 12/2014 | O'Connor et al. |
| 2015/0016040 A1 | 1/2015 | Hood, III et al. |
| 2015/0020351 A1 | 1/2015 | Lin |
| 2015/0092337 A1 | 4/2015 | Tan et al. |
| 2015/0153787 A1 | 6/2015 | Mok et al. |
| 2015/0154437 A1 | 6/2015 | Aoki et al. |
| 2015/0176317 A1 | 6/2015 | Lee |
| 2015/0184437 A1 | 7/2015 | Wikander et al. |
| 2015/0227175 A1 | 8/2015 | Motosugi |
| 2015/0241978 A1 | 8/2015 | Lombardi et al. |
| 2015/0267450 A1 | 9/2015 | Chiang |
| 2015/0277506 A1 | 10/2015 | Cheah et al. |
| 2015/0309539 A1 | 10/2015 | Kamphuis et al. |
| 2015/0345195 A1 | 12/2015 | Park |
| 2015/0361696 A1 | 12/2015 | Tazbaz |
| 2015/0362956 A1 | 12/2015 | Tazbaz |
| 2015/0362958 A1 | 12/2015 | Shang |
| 2016/0041589 A1 | 2/2016 | Tazbaz |
| 2016/0070310 A1 | 3/2016 | Holung et al. |
| 2016/0083988 A1 | 3/2016 | Hsu |
| 2016/0109908 A1 | 4/2016 | Siddiqui |
| 2016/0132075 A1 | 5/2016 | Tazbaz |
| 2016/0132076 A1 | 5/2016 | Bitz et al. |
| 2016/0147267 A1 | 5/2016 | Campbell et al. |
| 2016/0153222 A1 | 6/2016 | Hu |
| 2016/0187934 A1 | 6/2016 | Lee et al. |
| 2016/0187935 A1 | 6/2016 | Tazbaz et al. |
| 2016/0201367 A1 | 7/2016 | Kato |
| 2016/0215541 A1 | 7/2016 | Tazbaz et al. |
| 2016/0224072 A1 | 8/2016 | Huang et al. |
| 2016/0266615 A1 | 9/2016 | Uchiyama et al. |
| 2016/0299537 A1 | 10/2016 | Whitt et al. |
| 2016/0326786 A1 | 11/2016 | Lee |
| 2016/0357226 A1 | 12/2016 | Campbell et al. |
| 2017/0017273 A1 | 1/2017 | Weldon et al. |
| 2017/0090523 A1 | 3/2017 | Tazbaz et al. |
| 2017/0145724 A1 | 5/2017 | Siddiqui |
| 2017/0145725 A1 | 5/2017 | Siddiqui |
| 2018/0059735 A1 | 3/2018 | Tazbaz et al. |
| 2018/0066465 A1 | 3/2018 | Tazbaz et al. |
| 2018/0164855 A1* | 6/2018 | Tazbaz .................. G06F 1/1681 |
| 2018/0209473 A1 | 7/2018 | Park et al. |
| 2018/0230724 A1* | 8/2018 | Lin .......... E05D 11/06 |
| 2018/0292860 A1* | 10/2018 | Siddiqui ............... G06F 1/1618 |
| 2018/0356858 A1* | 12/2018 | Siddiqui ............. H04M 1/0216 |
| 2018/0363341 A1* | 12/2018 | Siddiqui .................. E05D 3/06 |
| 2019/0094917 A1* | 3/2019 | Schmelzle .............. F16C 11/04 |

FOREIGN PATENT DOCUMENTS

| | | |
|---|---|---|
| CN | 203376667 U | 1/2014 |
| CN | 104331124 A | 2/2015 |
| CN | 204610543 U | 9/2015 |
| EP | 0928092 A2 | 7/1999 |
| EP | 1422593 A1 | 5/2004 |
| EP | 2466420 A1 | 6/2012 |
| EP | 2528307 A1 | 11/2012 |
| EP | 2797296 A2 | 10/2014 |
| GB | 2008940 A | 6/1979 |
| JP | 2006112523 A | 4/2006 |
| WO | 2007/072124 A1 | 6/2007 |
| WO | 2010/076639 A2 | 7/2010 |
| WO | 2010/093139 A2 | 8/2010 |
| WO | 2015/073020 A1 | 5/2015 |
| WO | 2015/147885 A1 | 10/2015 |
| WO | 2015/179257 A1 | 11/2015 |
| WO | 2017087343 A1 | 5/2017 |

OTHER PUBLICATIONS

Martin, Harlan, "Geared Hinge", published on Jan. 27, 2015, retrieved at «https://www.thingiverse.com/make:116451» on Aug. 9, 2017, 1 page.

Non-Final Office Action dated Jul. 17, 2017 from U.S. Appl. No. 14/947,994, 23 pages.

Final Office Action dated Jun. 14, 2017 from U.S. Appl. No. 14/947,740, 25 pages.

Applicant-Initiated Interview Summary dated Aug. 8, 2017 from U.S. Appl. No. 14/947,740, 3 pages.

Response filed Aug. 9, 2017 to the Final Office Action dated Jun. 14, 2017 from U.S. Appl. No. 14/947,740, 9 pages.

Non-Final Office Action dated Aug. 28, 2017 from U.S. Appl. No. 14/947,740, 21 pages.

Article 34 Amendment and Chapter II Demand filed Jun. 19, 2017 from PCT Patent Application No. PCT/US2016/061940, 21 pages.

Article 34 Amendment and Chapter II Demand filed May 19, 2017 from PCT Patent Application No. PCT/US2016/061942, 14 pages.

"360 deg Hinge Video," published Jul. 21, 2013, retrieved at <<https://www.youtube.com/watch?v=IhEczMi4nsw>> on Aug. 17, 2016, 1 page.

Domingo, Joel Santo, "Laptop, Tablet or Both? How to Decide," retrieved from <<http://in.pcmag.com/laptops/64076/feature/laptop-tablet-or-both-how-to-decide>>, published May 1, 2014, 11 pages.

"Special Purpose Hinges (cont)," published Jan. 4, 2007, retrieved at <<http://hingedummy.info/specialpurposepage2.htm>> on Aug. 17, 2016, 2 pages.

"ASUS Transformer Book Flip TP200SA 360-Degree Convertible Laptop With Quad-core Processor," published Oct. 18, 2015, retrieved from << http://www.tipandtrick.net/asus-transformer-book-flip-tp200sa-360-degree-convertible-laptop-full-review/>> on Oct. 26, 2015, 3 pages.

(56) References Cited

OTHER PUBLICATIONS

BESTEK® 10"-15" Laptop/Notebook Cooling Pad Six-level Changeable Stand with Dual 118mm Hydraulic Fan Dual USB 2.0 360 degree Rotatable Base BTCPZ4BL, published Nov. 20, 2014, retrieved from <<http://www.amazon.com/Notebook-Six-level-Changeable-Hydraulic-Rotatable/dp/B00L81F6W0>> on Aug. 31, 2015, 5 pages.
Brown, Mlichael, "Dell targets younger audience with 360-degree laptops and thin, light All-in-One PCs", retrieved from <<http://www.pcworld.com/article/2304649/dell-targets-younger-audience-with-360-degree-laptops-and-thin-light-all-in-one-pcs.htm>>, published Jun. 2, 2014, 7 pages.
"Computex: Asus Transformer Book Flip series launched with 360 Degree Hinge", published Jun. 3, 2014, retrieved from <<http://tech.firstpost.com/news-analysis/computex-asus-transformer-book-flip-series-launched-with-360-degree-hinge-225064.html>> on Aug. 28, 2015, 4 pages.
Hinckley et al., "Codex: A Dual Screen Tablet Computer", In Proceedings of the SIGCHI Conference on Human Factors in Computing Systems, Boston, MA, CHI 2009—New Mobile Interactions, Apr. 9, 2009, pp. 1933-1942, 10 pages.
"HP Spectre introduce hybrid x360 laptop, rotate 360 degrees, $900", published Apr. 25, 2015, retrieved from <<http://sharetech.biz/hp-spectre-introduce-hybrid-x360-laptop-rotate-360-%E2%80%8B%E2%80%8Bdegrees-900/>> on Oct. 26, 2015, 4 pages.
Kravitz, Noah, "Kyocera Echo Unboxing—Dual-Screen Android Phone (video)", published Apr. 13, 2011, retrieved from <<http://www.technobuffalo.com/videos/kyocera-echo-unboxing-dual-screen-android-phone-video/>> on Oct. 26, 2015, 7 pages.
Pradeep, "HP Announces New Pavilion x360 Convertible Laptop Inspired by Lenovo Yoga, Price Starts At $400", published Feb. 23, 2014, retrieved from <<http://microsoft-news.com/hp-announces-new-pavilion-x360-convertible-laptop-inspired-by-lenovo-yoga-price-starts-at-400/>> on Oct. 26, 2015, 9 pages.
Smith, Dada, "Lenovo's New Flex 3 Convertible Laptops Sport a 360 Degree Hinge", retrieved from <<http://blog.parts-people.com/2015/05/13/lenovos-new-flex-3-convertible-laptops-sport-a-360-degree-hinge/>>, published May 13, 2015, 2 pages.
Smith, Dada, "Microsoft Helps HP Design New Convertible Spectre x360," published Mar. 3, 2015, retrieved at <<http://blog.parts-people.com/2015/03/03/microsoft-helps-hp-design-ne-convertible-spectre-x3601>>, 1 page.
Smith, Sherri L., "Toshiba Satellite Radius Folds into 5 Different Modes", published May 27, 2014, retrieved at <<http://blog.laptopmag.com/toshiba-satellite-radius-specs-price>> on Sep. 1, 2015, 4 pages.
Villa, Jason de, "iPad mini case review: The best generic case you can get right now", published Jan. 1, 2013, retrieved from <<http://technoodling.net/ipad-mini-case-review-the-best-generic-case-you-can-get-right-now/>> on Aug. 28, 2015, 12 pages.
Wang, Harry, "The 360 Degrees (and 25,000 Hinge Tests) of Yoga Design," Dec. 5, 2012, retrieved at <<http://blog.lenevo.com/en/blog/the-360-degrees-of-yoga-design>>, 14 pages.
Non-Final Office Action dated Feb. 9, 2017 from U.S. Appl. No. 14/947,740, 35 pages.
Response filed Apr. 13, 2017 to the Non-Final Office Action dated Feb. 9, 2017 from U.S. Appl. No. 14/947,740, 9 pages.
International Search Report and Written Opinion dated Feb. 20, 2017 from PCT Patent Application No. PCT/US2016/061940, 13 pages.
Non-Final Office Action dated Nov. 3, 2016 from U.S. Appl. No. 14/947,994, 25 pages.
Response filed Jan. 11, 2017 to the Non-Final Office Action dated Nov. 3, 2016 from U.S. Appl. No. 14/947,994, 12 pages.
Final Office Action dated Feb. 16, 2017 from U.S. Appl. No. 14/947,994, 13 pages.
Response filed Apr. 3, 2017 to the Final Office Action dated Feb. 16, 2017 from U.S. Appl. No. 14/947,994, 9 pages.
Applicant-Initiated Interview Summary dated Apr. 4, 2017 from U.S. Appl. No. 14/947,994, 3 pages.
International Search Report and Written Opinion dated Feb. 16, 2017 from PCT Patent Application No. PCT/US2016/061942, 12 pages.
"Final Office Action Issued in U.S. Appl. No. 15/256,302", dated Oct. 17, 2018, 12 Pages.
Written Opinion dated Sep. 6, 2017 from PCT Patent Application No. PCT/US2016/061940, 9 pages.
Final Office Action dated Nov. 2, 2017 from U.S. Appl. No. 14/947,994, 44 pages.
Written Opinion dated Aug. 24, 2017 from PCT Patent Application No. PCT/US2016/061942, 7 pages.
"International Search Report & Written Opinion Issused in PCT Application No. PCT/US18/034011", dated Nov. 16, 2018, 13 Pages.
"Acer Unveils Industry's First Convertible Chromebook with 13-inch Display," Aug. 31, 2016, retrieved at <<http://www.acer.com/ac/en/US/press/2016/202372>>, 2 pages.
"International Search Report & Written Opinion Issued in PCT Application No. PCT/US2018/013036", dated Apr. 6, 2018, 11 Pages.
"Moving Point Hinge-Multipivot Hinge", Retrieved from : http://websystem.gismo.se/Gismo/files/1029/2.mph%2001%20introduktion.pdf :, Retrieved on: Oct. 9, 2014, 6 Pages.
"Non-Final Office Action issued in U.S. Appl. No. 14/555,184", dated Apr. 12, 2016, 10 Pages.
"Non Final Office Action issued in U.S. Appl. No. 14/947,740", dated Aug. 28, 2017, 17 Pages.
"Non Final Office Action issued in U.S. Appl. No. 14/947,994", dated Apr. 5, 2018, 28 Pages.
"Non Final Office Action Issued in U.S. Appl. No. 15/239,417", dated May 25, 2017, 10 Pages.
"Non Final Office Action issued in U.S. Appl. No. 15/255,056", dated Sep. 28, 2018, 11 Pages.
"Non Final Office Action Issued in U.S. Appl. No. 15/256,302", dated May 1, 2018, 9 Pages.
"Non Final Office Action issued in U.S. Appl. No. 15/374,594", dated Sep. 19, 2017, 11 Pages.
"Final Office Action issued in U.S. Appl. No. 15/414,432", dated May 17, 2018, 9 Pages.
"Non Final Office Action issued in U.S. Appl. No. 15/414,432", dated Nov. 29, 2017, 10 Pages.
"Notice of Allowance Issued in U.S. Appl. No. 15/618,067", dated May 24, 2018, 8 Pages.
"Notice of Allowance Issued in U.S. Appl. No. 15/691,524", dated Sep. 24, 2018, 10 Pages.
Elliot, Amy-Mae, "9 Nifty Laptop Feet to Keep Your PC Running Cool", Retrieved from: https://mashable.com/2012/07/30/laptop-feet/#norOLvMOFaqy :, Jul. 30, 2012, 26 Pages.
"International Search Report and Written Opinion issued in PCT Application No. PCT/US18/034245", dated Aug. 13, 2018, 14 pages.
"International Preliminary Report on Patentability Issued in PCT Application No. PCT/US2015/060959"; dated Mar. 3, 2017, 7 Pages.
"International Search Report & Written Opinion Issued in PCT Application No. PCT/US2015/060959", dated Jan. 25, 2016, 11 Pages.
"Second Written Opinion issued in PCT Application No. PCT/US2015/060959", dated Oct. 10, 2016, 7 Pages.
"International Search Report and Written Opinion issued in PCT Application No. PCT/US2017/013591", dated Apr. 21, 2017, 11 Pages.
"International Search Report and Written Opinion issued in PCT Application No. PCT/US2017/013687", dated Apr. 21, 2017, 12 Pages.
Final Office Action dated Feb. 5, 2018 from U.S. Appl. No. 14/47,740, 54 pages.
International Preliminary Report on Patentability dated Jan. 23, 2018 from PCT Patent Application No. PCT/US2016/061940, 10 pages.
International Report on Patentability dated Jan. 18, 2018 from PCT Patent Application No. PCT/US2016/061942, 10 pages.

(56) References Cited

OTHER PUBLICATIONS

Non-Final Office Action dated Jun. 9, 2017 from U.S. Appl. No. 15/256,302, 17 pages.
"Final Office Action Issued in U.S. Appl. No. 15/255,056", dated Apr. 11, 2019, 6 Pages.

* cited by examiner

HINGED DEVICE

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced.

DESCRIPTION

The present concepts relate to devices, such as computing devices employing hinge assemblies that can rotationally secure first and second device portions relative to a first hinge axis that relates to the first portion and a second hinge axis that relates to the second portion. From one perspective, some of the present hinge assemblies can be viewed as being 'self-spacing' in that the hinge controls spacing between the first and second portions during rotation to prevent damage to the device. Toward this end, the first and second portions can be biased toward the first and second hinge axes. Multi-lobe cams can be defined by (or relative to) the first and second portions that overcome the bias and force the first and second portions away from the hinge axes at specific orientations, such as when the first and second portions are not oriented parallel to one another.

Figure 1:
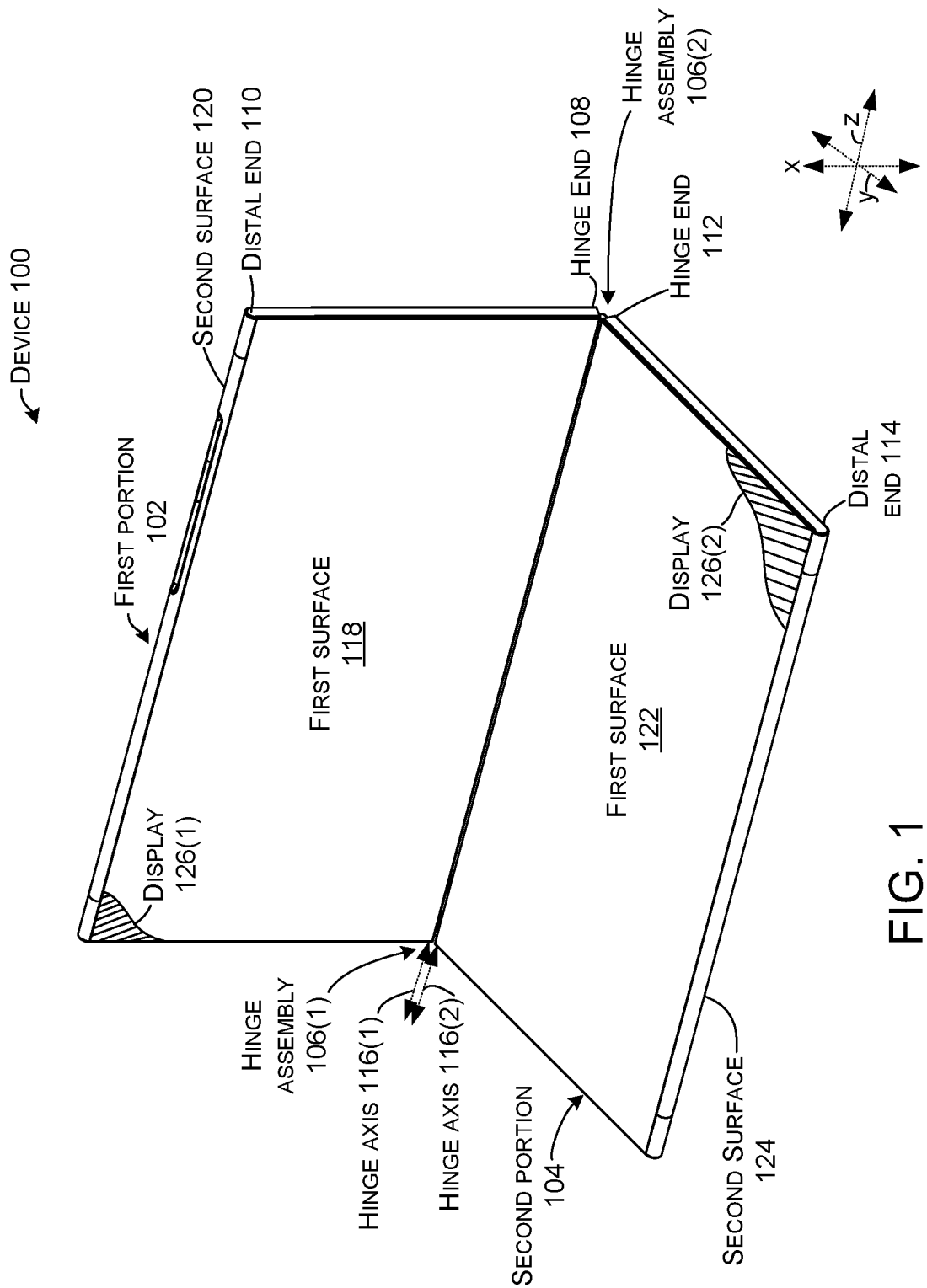
FIGS. 1, 2A-2D, 4A, 5A, 6A, 7A, 8A, and 9A show perspective views of example devices in accordance with some implementations of the present concepts.

Introductory FIG. 1 shows an example device 100 that has first and second portions 102 and 104 that are rotatably secured together by self-spacing hinge assemblies (e.g., hinge assemblies) 106. In the illustrated implementation two hinge assemblies 106(1) and 106(2) are employed, but other implementations could employ a single hinge assembly or more than two hinges assemblies.

The first portion 102 can extend from a hinge end 108 to a distal end 110. The second portion 104 also can extend from a hinge end 112 to a distal end 114. The hinge assembly 105 can define two hinge axes 116. The first portion 102 can rotate around first hinge axis 116(1) and the second portion 104 can rotate around second hinge axis 116(2). The first portion 102 can include opposing first and second major surfaces 118 and 120 (hereinafter, first and second surfaces). Similarly, the second portion 104 can include opposing first and second major surfaces 122 and 124 (hereinafter, first and second surfaces). (Note the second surfaces 120 and 124 are facing away from the viewer and as such are not directly visible in this view, but are shown and designated in subsequent FIGS).

In some implementations, displays 126 can be positioned on the first and/or second surfaces. In this case, displays 126(1) and 126(2) are interposed between the self-spacing hinge assemblies 106(1) and 106(2). In the illustrated configuration, the displays 126 are positioned on first surfaces 118 and 122, respectively.

Figure 2A:
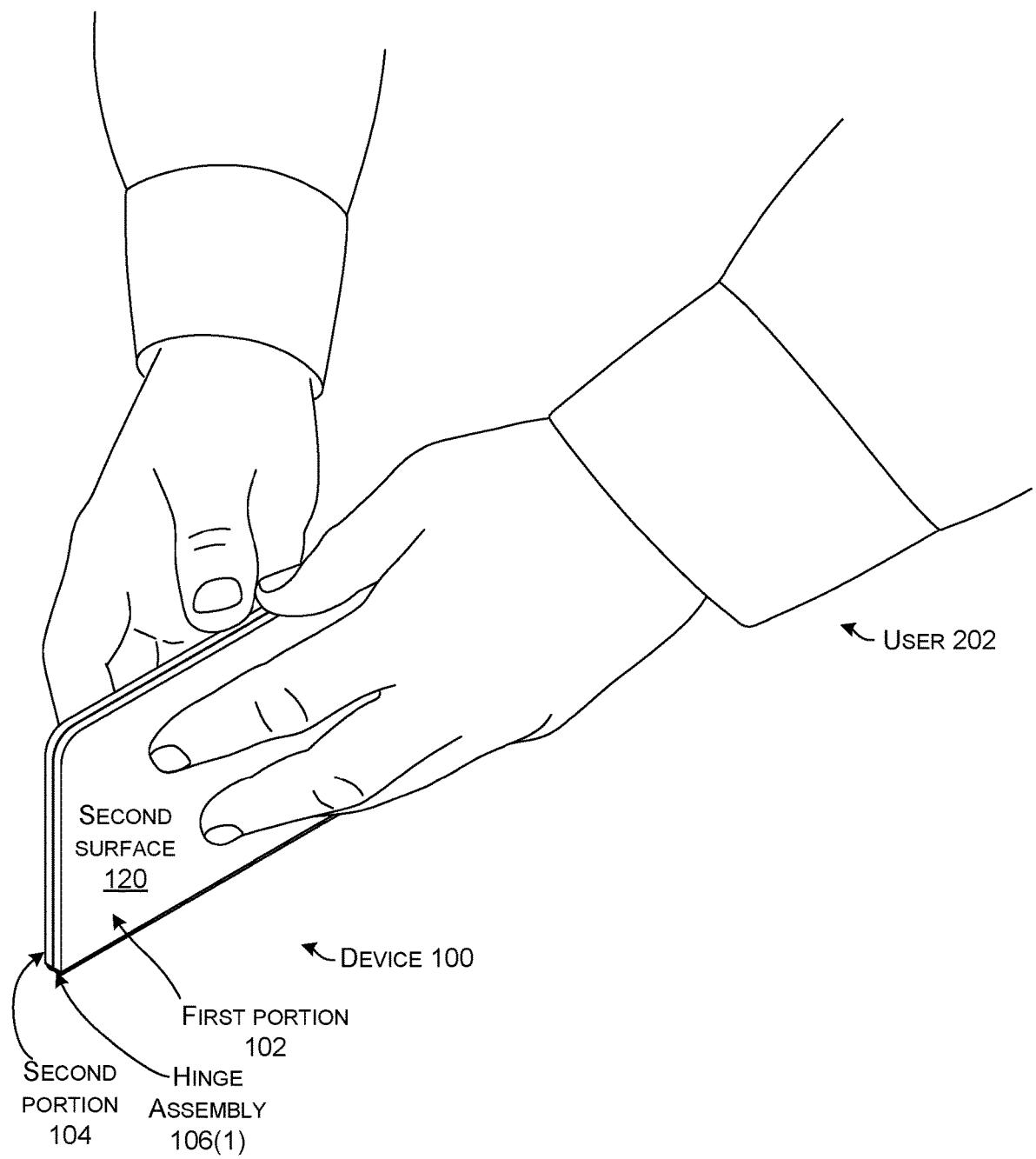

FIGS. 2A-2D collectively show a use case scenario of device 100. FIG. 2A starts with device 100 in the closed orientation where the first and second portions 102 and 104 are positioned parallel to and against one another and are rotatably secured by self-spacing hinge assembly 106. In this case, the second surfaces are facing outwardly with the first portion's second surface 120 facing the reader and the first surfaces (designated in FIG. 2B) facing inwardly. The closed orientation can be very compact and easy for the user 202 to transport. For instance, the device may fit in the user's pocket. Further, the first surfaces can be protected in this closed orientation by the second surfaces. The device can be biased to maintain this orientation until acted upon by the user. At this point user 202 is starting to open the device 100 (e.g., rotate the first portion 102 and second portion 104 away from one another).

Figure 2B:
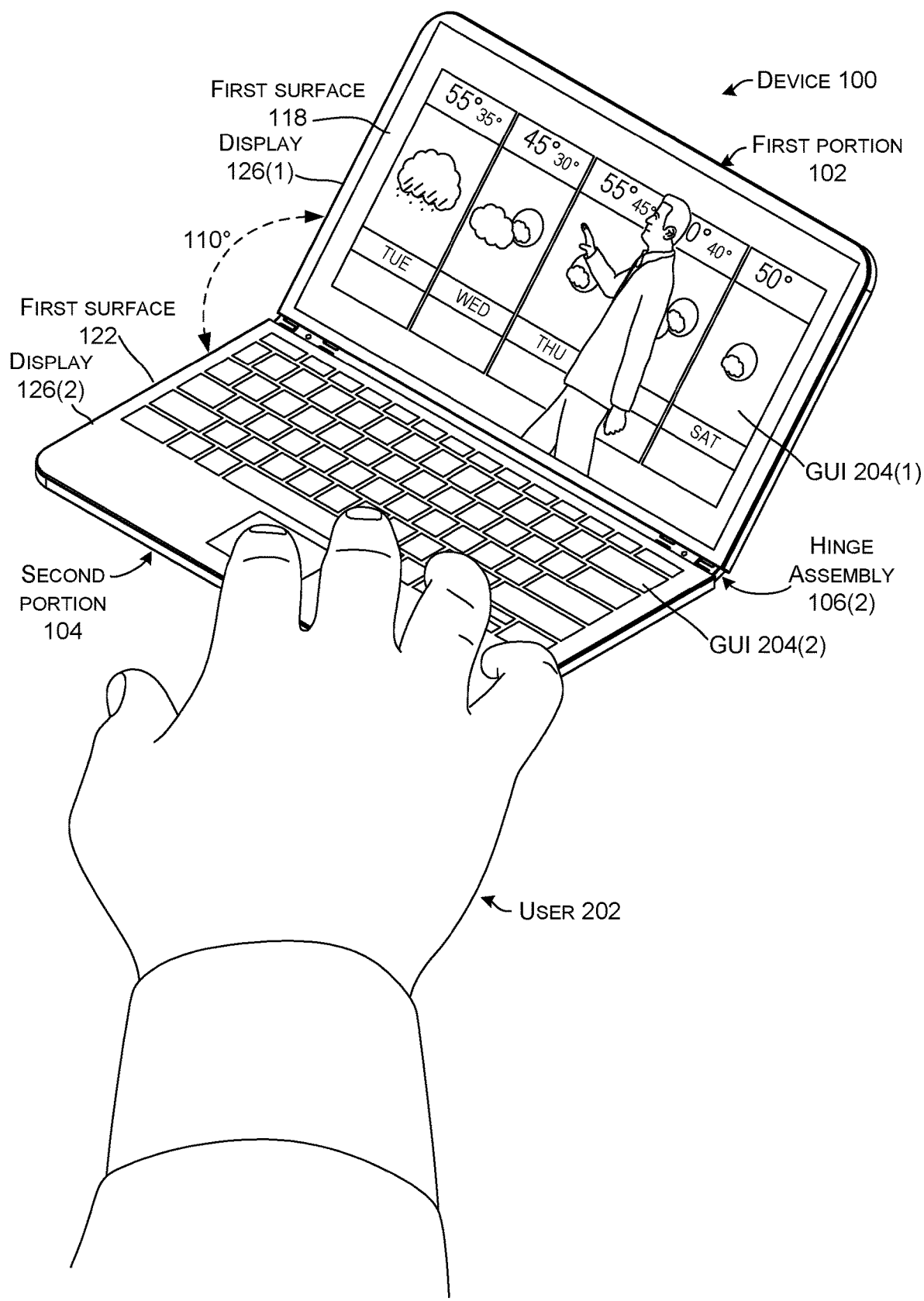

FIG. 2B shows the device 100 opened to an angle defined between the first and second portions 102 and 104 of about 110 degrees. This orientation can be thought of as a 'notebook' or 'laptop' orientation. The notebook orientation can be manifest as an angle in a range from about 90 degrees to about 150 degrees. In this case, the first and second portions 102 and 104 are configured to maintain this relative orientation while the user 202 uses the device. In this example, video content is presented on a GUI 204(1) on display 126(1) of the first portion 102 and a virtual keyboard is presented on display 126(2) on second portion 104. The user can control GUI 204(1) via the virtual keyboard of GUI 204(2).

Figure 2C:
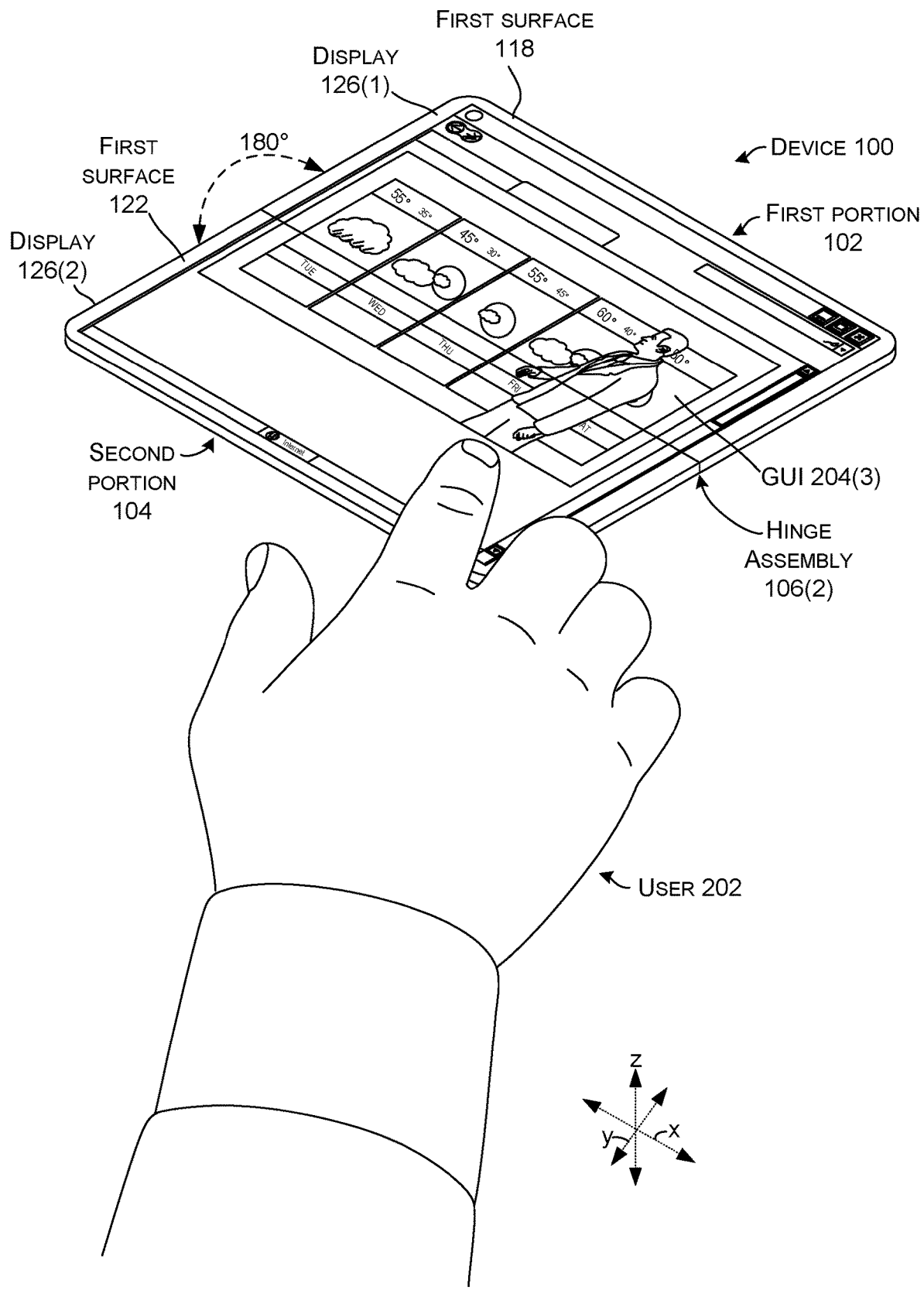

FIG. 2C shows the device 100 rotated until the relative angle is about 180 degrees between the first and second portions 102 and 104 so that the first and second portions are once again parallel to one another. In this orientation, the first and second portions are (substantially) parallel and abutting one another whereas in the closed orientation of FIG. 2A the first and second portions are (substantially) parallel and positioned one over the other.

In the abutting orientation of FIG. 2C, a single GUI 204(3) can be presented collectively across displays 126(1) and 126(2). This GUI 204(3) offers basically twice the display area of either first portion 102 or second portion 104. The device can be biased to maintain this fully open orientation for viewing, yet when not utilized by the user 202, the user can close the device 100 to a compact easy to carry configuration (e.g., see FIG. 2A) that protects the displays 126 from damage.

Figure 2D:
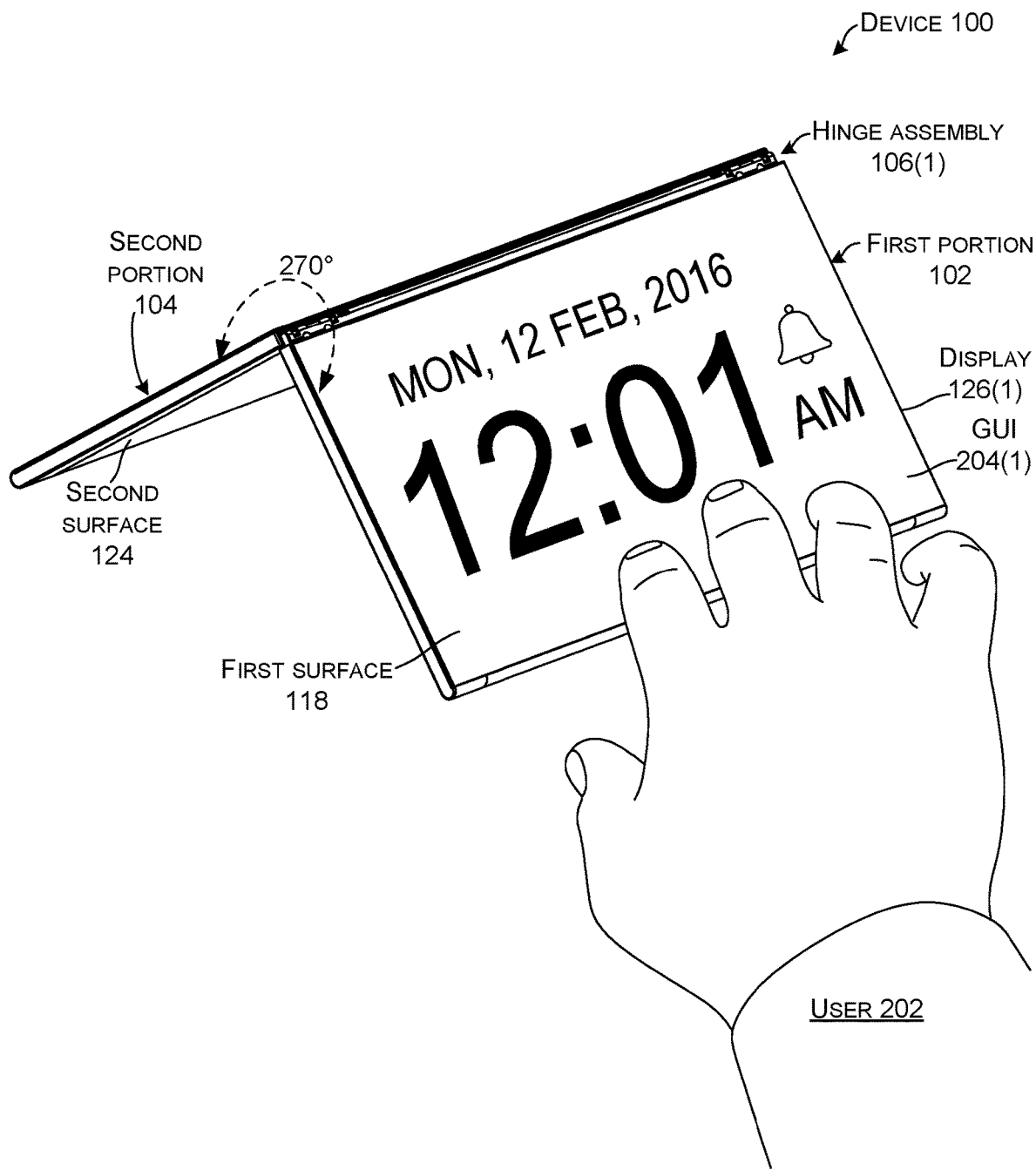

FIG. 2D shows another orientation where the angle α is about 270 degrees (or in a range from about 240 degrees to about 330 degrees). This orientation can be thought of as an 'alarm clock' orientation where the device stands on its own and the displays 126 are readily visible to the user.

Note that while obscured by the displays 126, several electronic components, such as circuit boards, processors, and/or storage/memory can be secured to the first and second portions 102 and/or 104.

The processor can generate GUIs 204 for presentation on the displays 126. In some implementations, the processor may generate different GUIs for the displays when the first and second portions 102 and 104 are in some orientations and a single GUI for a combined presentation in other orientations. For instance, when the first and second portions are oriented at 90 degrees relative to one another, the processor may generate a first GUI for presentation on the first portion and a second GUI for presentation on the second portion. When the first and second portions are oriented to 180 degrees, the processor can generate a single GUI that is collectively presented across both displays to create a larger display area. In other orientations, such as the alarm clock orientation, the same GUI may be presented on both the first and second portions. For instance, the time could be presented on both portions so that it is visible from more positions around the device.

Stated another way, in some configurations, the first surfaces 118 and 122 can be manifest as displays 126, such that in the 180-degree orientation of FIG. 2C the displays can work cooperatively to create a larger (e.g., 2×) display area. In some cases, the second surfaces 120 and 124 can be manifest as protective covers so that in the orientation of FIG. 2A the protective covers protect the displays of the first surfaces. In other configurations, both the first and second surfaces can include displays, or neither can include displays.

FIGS. 3-9C collectively show another example self-spacing hinge assembly 106(1).

Figure 3:
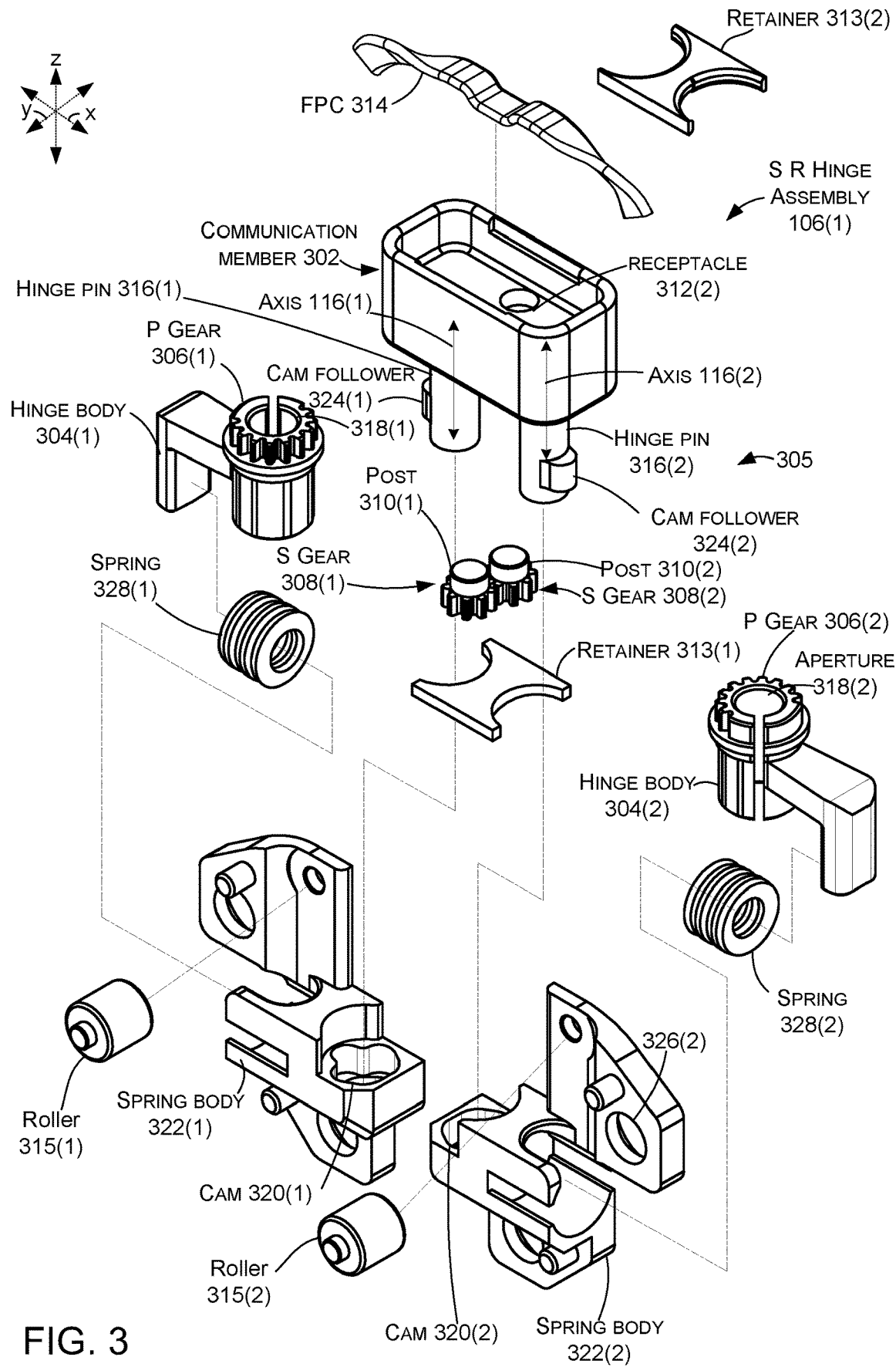
FIG. 3 shows an exploded perspective view of an example device in accordance with some implementations of the present concepts.

FIG. 3 is an exploded view that shows details of example self-spacing hinge assembly 106(1). The self-spacing hinge assembly 106(1) can include a communication member 302 and first and second hinge bodies 304(1) and 304(2). The self-spacing hinge assembly 106(1) can include a timing element 305 that synchronizes rotation (e.g., extent of rotation) of the first and second portions 102 and 104 around the first and second hinge axes 116. For instance, the timing element 305 can ensure that 20 degrees of rotation around the first hinge axis simultaneously produces 20 degrees of rotation around the second hinge axis. In the illustrated implementation, the timing element can be manifest as gears. For instance, the hinge bodies can define primary gears 306 that can interact with intervening or secondary gears 308. The secondary gears 308 are rotatably secured to communication member 302 by parallel hinge posts 310 that engage receptacles 312 in the communication member. (Only receptacle 312(2) is visible in FIG. 3). The secondary gears are retained in the communication member by retainer 313(1). Thus, the retainer 313(1) operating in cooperation with the communication member 302 can secure the secondary gears 308 in engaging relation with one another and with the primary gears 306.

The communication member 302 can also be shaped to receive a conductor, such as a flexible printed circuit (FPC) 314 (not shown to scale) that can be maintained in the communication member by retainer 313(2). The conductor can connect displays and/or other electronic components on the first portion 102 with displays and/or other electronic components on the second portion 104. Rollers 315 can be employed to decrease friction experienced by the FPC when rotation occurs around the first and second hinge axes 116.

The communication member 302 can include hinge pins 316 that pass through the primary gears 306 and apertures 318 in the first and second hinge bodies 304. In some implementations, the apertures 318 can be sized so the that the hinge bodies 304 act as friction cylinders for the hinge pins 316 (e.g., provide a degree of frictional resistance that can hold the first and second portions 102 and 104 in an existing orientation unless acted upon by the user). Further, the timing provided by the interaction of the primary gears 306 with the secondary gears 308 and the secondary gears with one another causes equal rotation around each hinge axis 116. For instance, ten degrees of rotation around hinge axis 116(1) is accompanied by ten degrees of rotation around hinge axis 116(2). Other timing mechanisms are contemplated. For example, other implementations can employ primary gears that directly intermesh with one another to provide the timing.

Multi-lobe cams 320 can be defined by and/or fixedly arranged relative to the first and second portions 102 and 104. In the illustrated implementation, spring bodies 322 are secured in fixed relation to the first and second portions 102 and 104. The multi-lobe cams 320 can be defined by the spring bodies 322. In this case, the multi-lobe cams are formed in the spring bodies (e.g., the multi-lobe cams can be manifest as cavities) and are aligned with hinge axes 116. In some implementations, the hinge pins 316 include cam followers 324 that extend orthogonally to the hinge axes. The hinge pins 316 are received in the cavity of the multi-lobe cams so that the cam followers 324 engage the multi-lobe cams 320 (illustrated and described relative to FIGS. 4A-9C).

In the illustrated implementation, the spring bodies 322 can be fixed to the first and second portions 102 and 104, such as by fasteners (not shown) through holes 326 (not all of which are designated with specificity). The spring bodies 322 are arranged in a sliding relationship relative to the hinge bodies 304 (e.g., slideable toward and away from the hinge axes 116). Biasing elements, such as springs 328 can bias the spring bodies 322 (and hence the first and second portions) toward the hinge axes 116.

FIGS. 4A-9C collectively show how multi-lobe cams 320 can move the first and second portions 102 and 104 apart from one another at specific orientations as the first and second portions are rotated through a range of rotation. Note that to visualize elements of the self-spacing hinge assembly 106(1), the first and second portions are removed entirely in FIGS. 4A, 4B, 5A, 5B, 6A, 6B, 7A, 7B, 8A, 8B, 9A, and 9B, and shown in ghost in FIGS. 4C, 5C, 6C, 7C, 8C, and 9C. Recall that spring body 322(1) can be fixedly attached to the first portion 102 and spring body 322(2) can be fixedly attached to the second portion 104 so the orientation of the spring bodies track the orientation of the first and second portions.

Figure 4A:
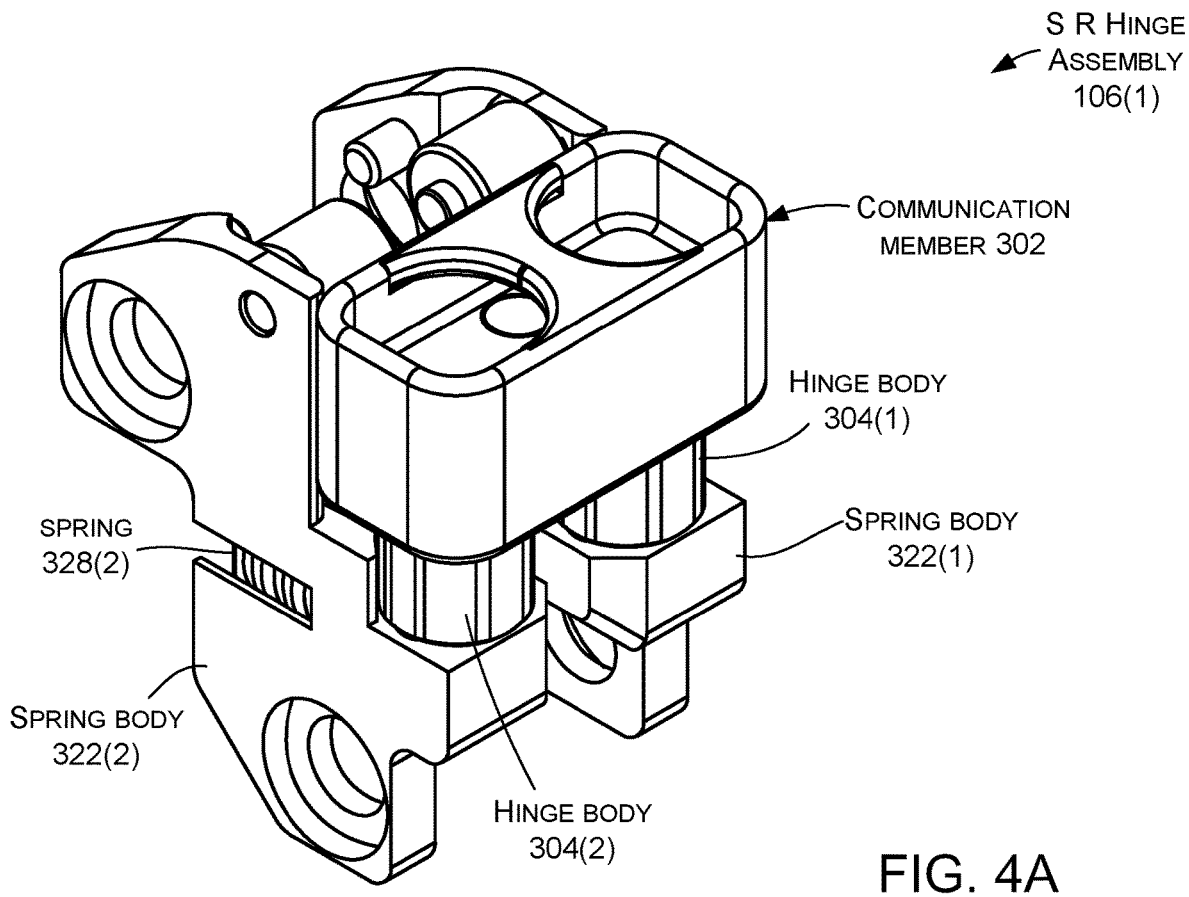
Figure 4B:
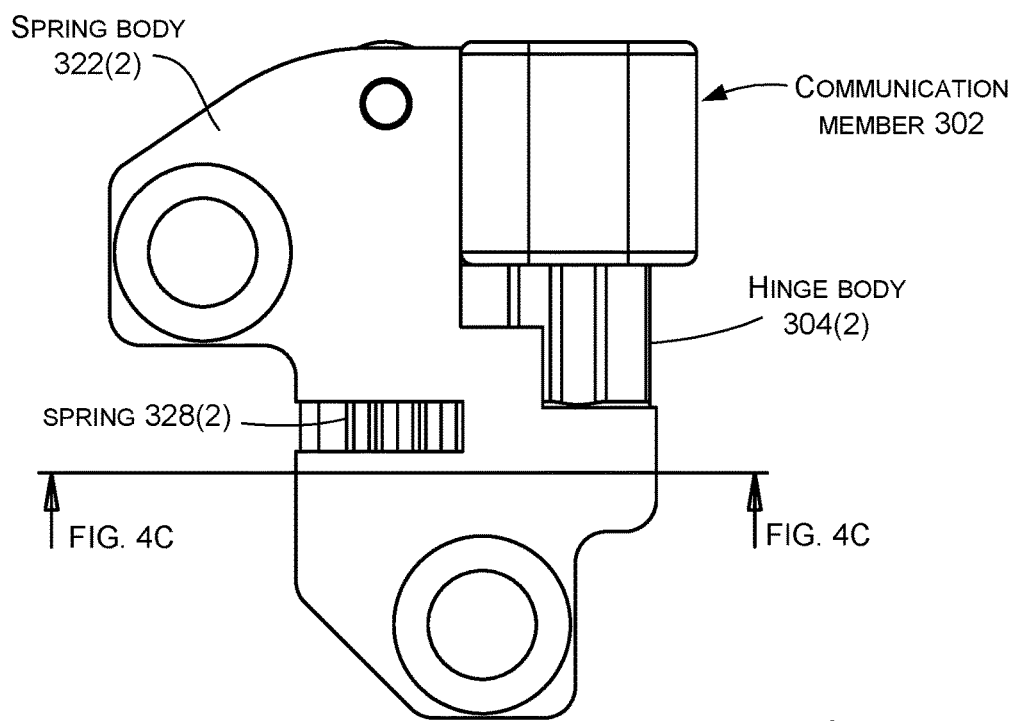
FIGS. 4B, 4C, 5B, 5C, 6B, 6C, 7B, 7C, 8B, 8C, 9B, and 9C show elevational views of example devices in accordance with some implementations of the present concepts.
Figure 4C:
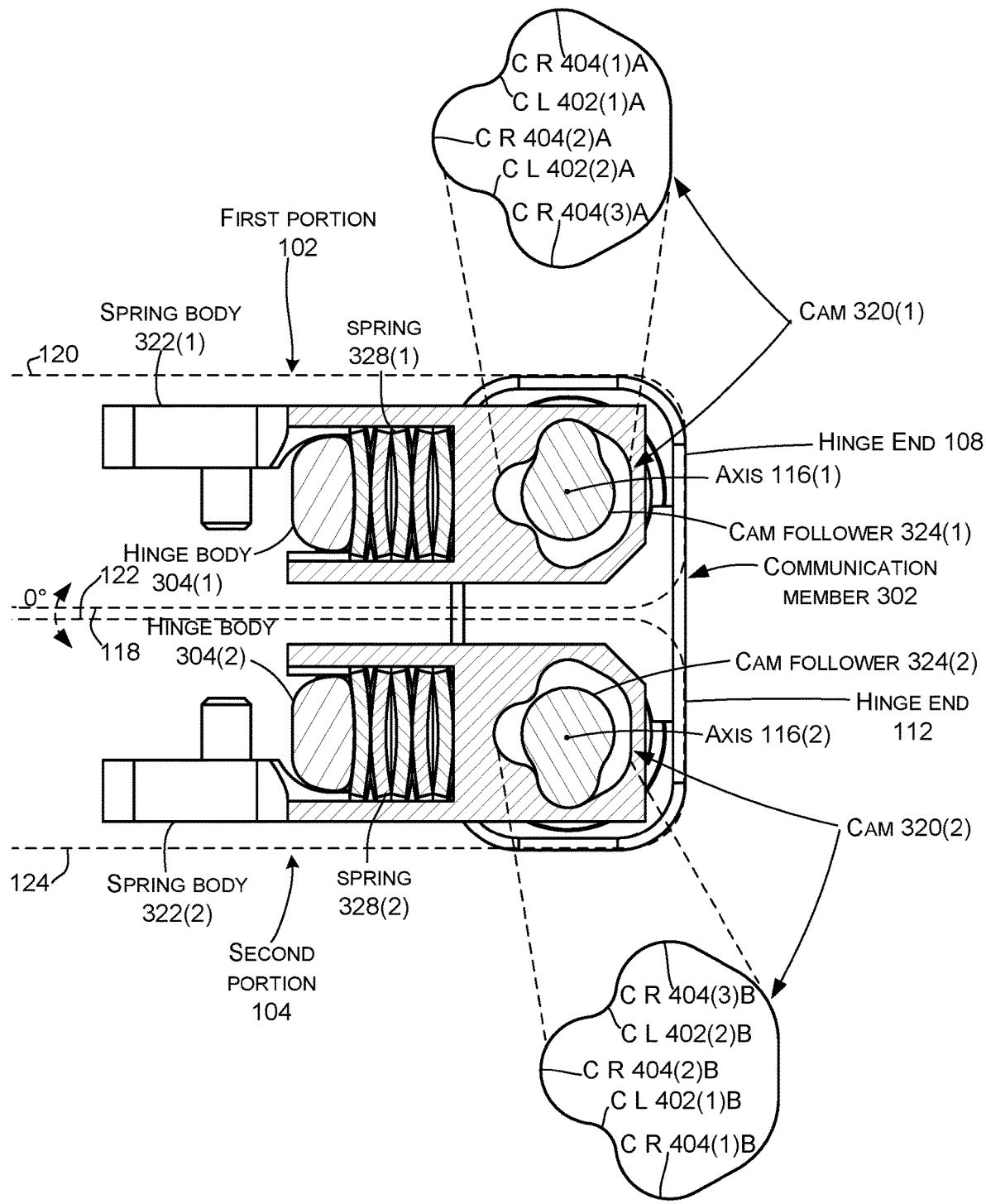
Figure 5A:
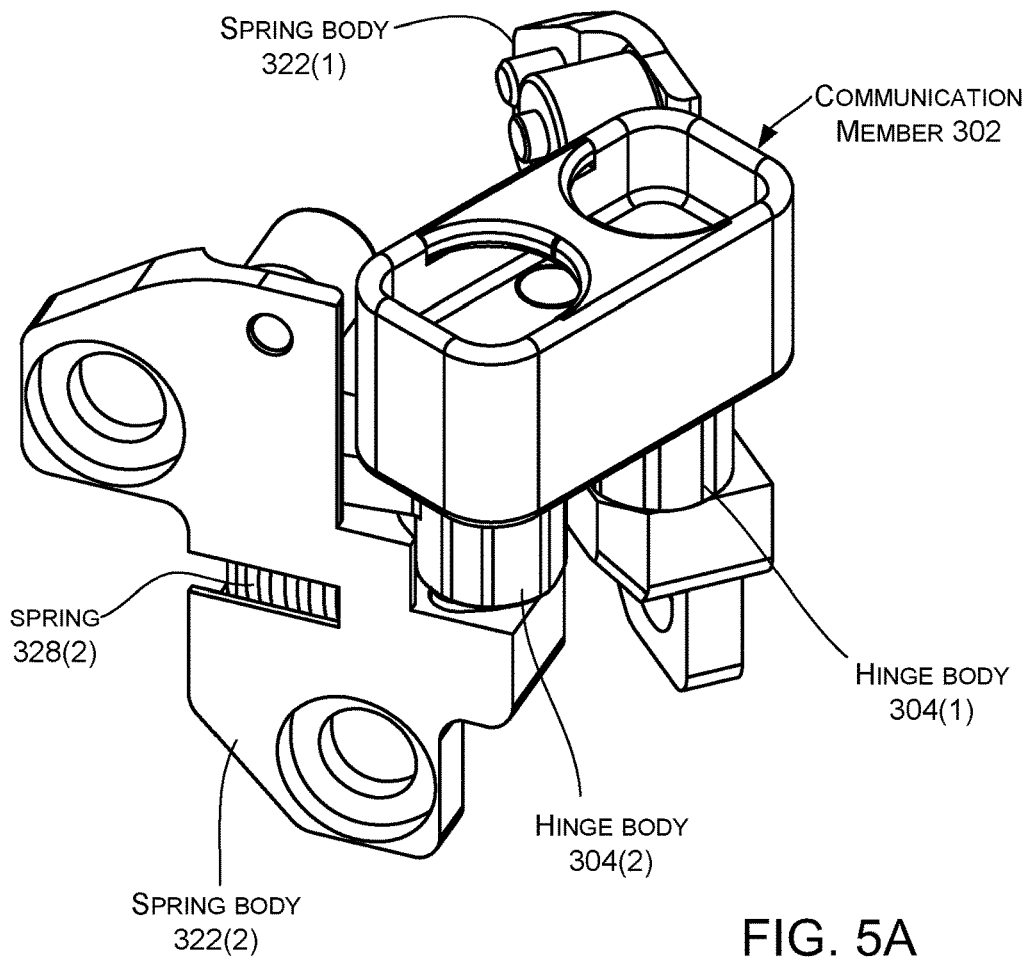
Figure 5B:
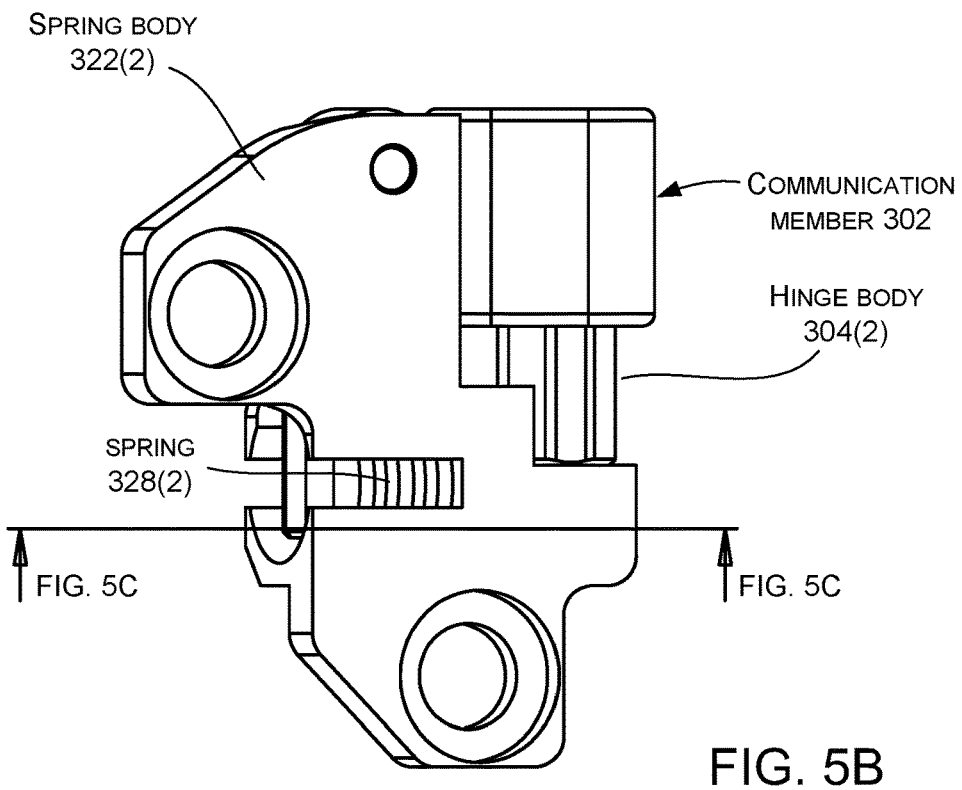
Figure 5C:
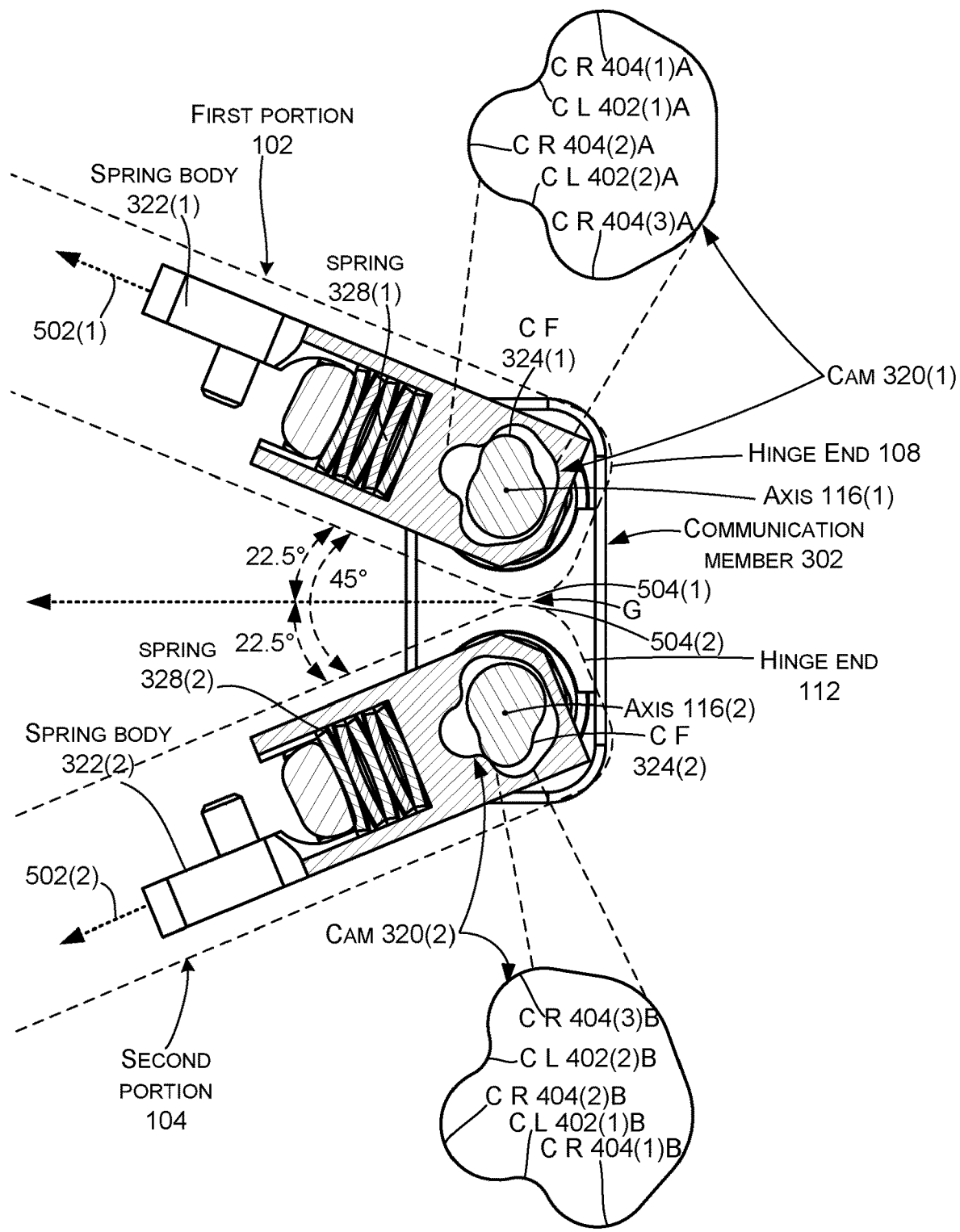
Figure 6A:
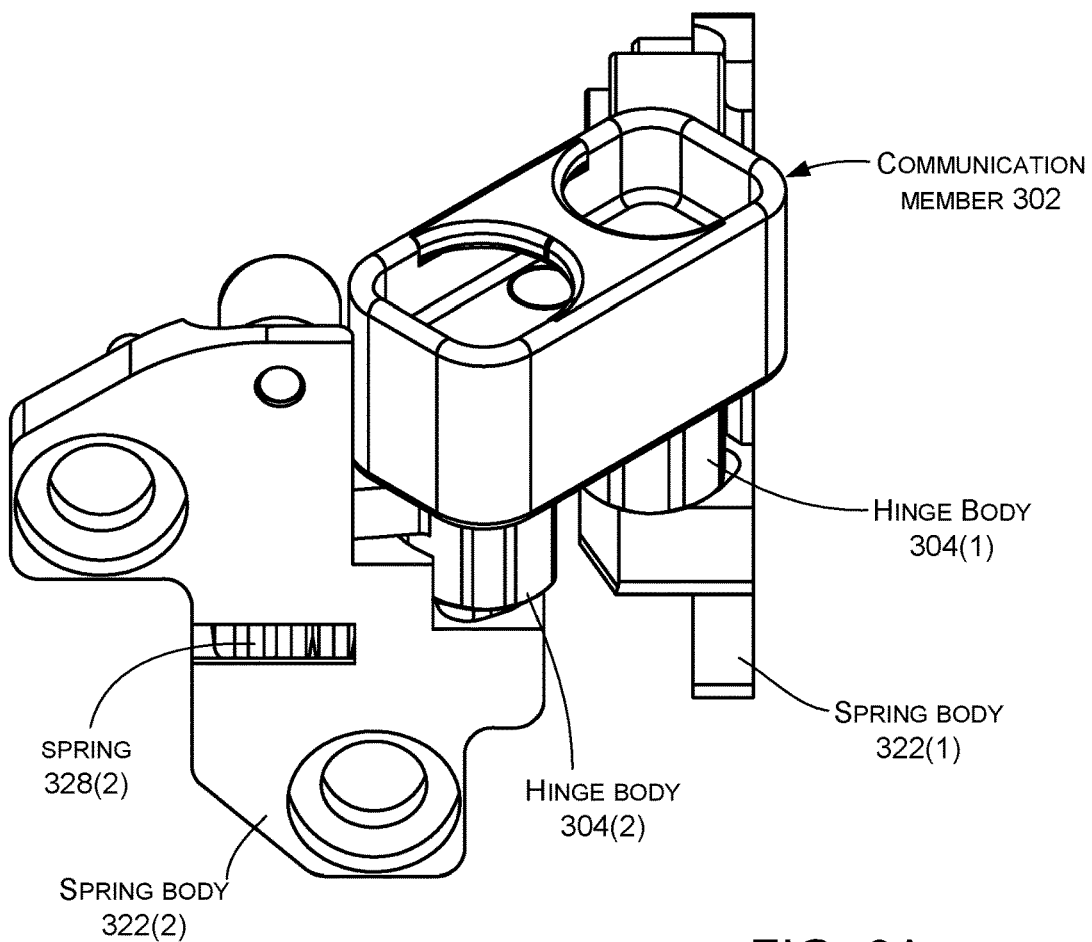
Figure 6B:
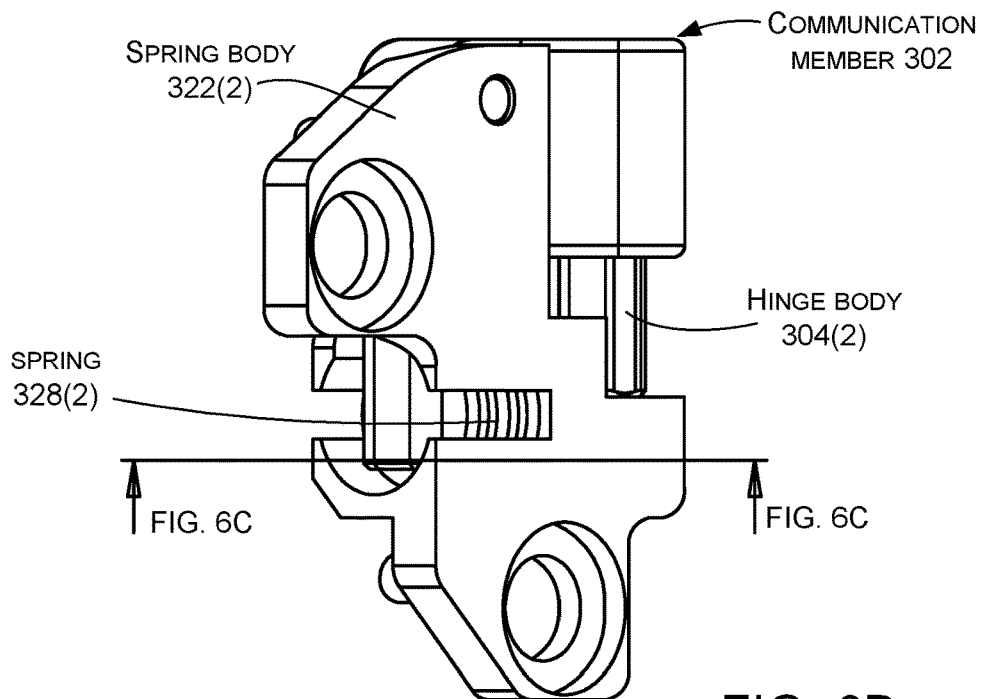
Figure 6C:
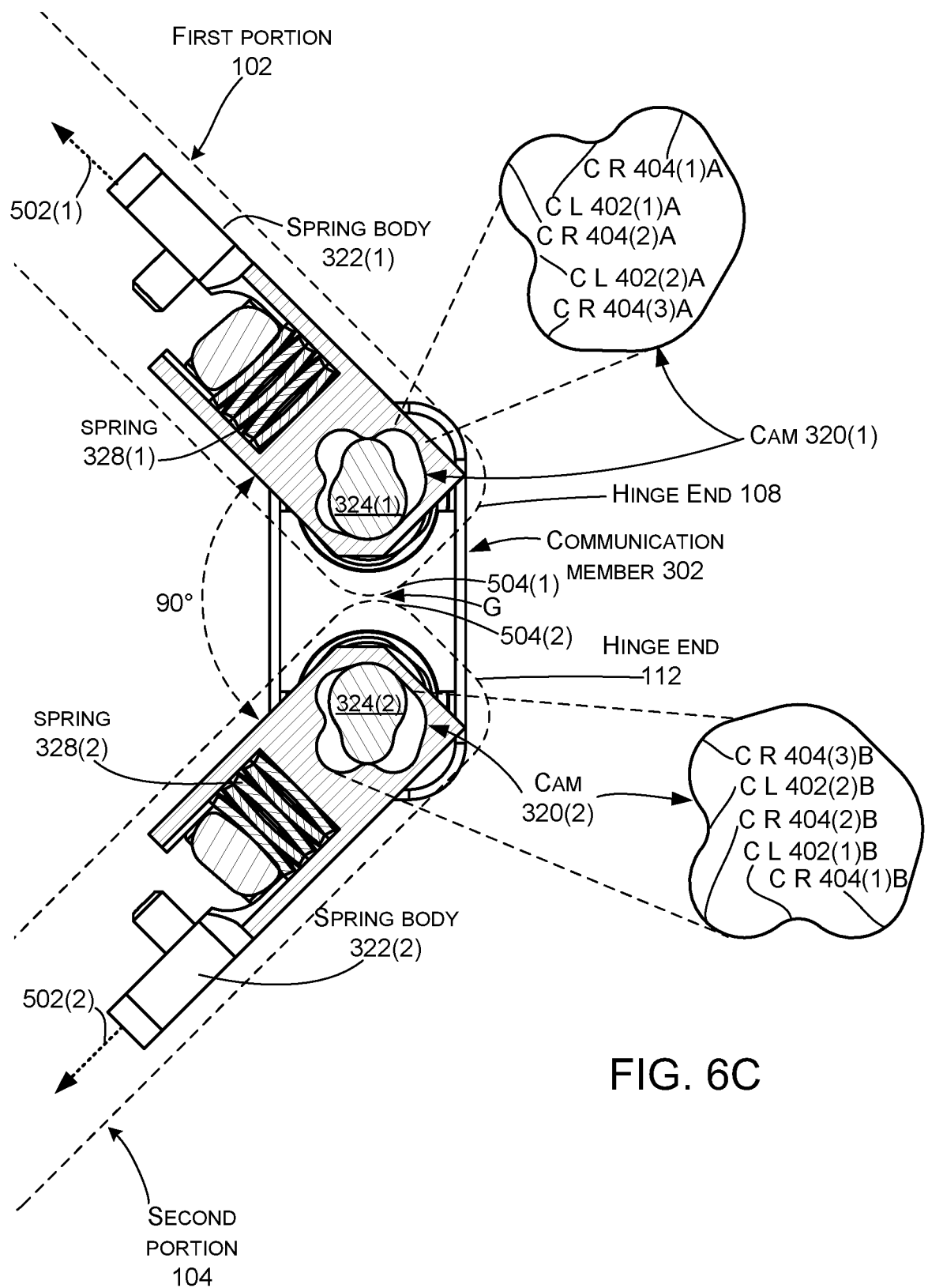
Figure 7A:
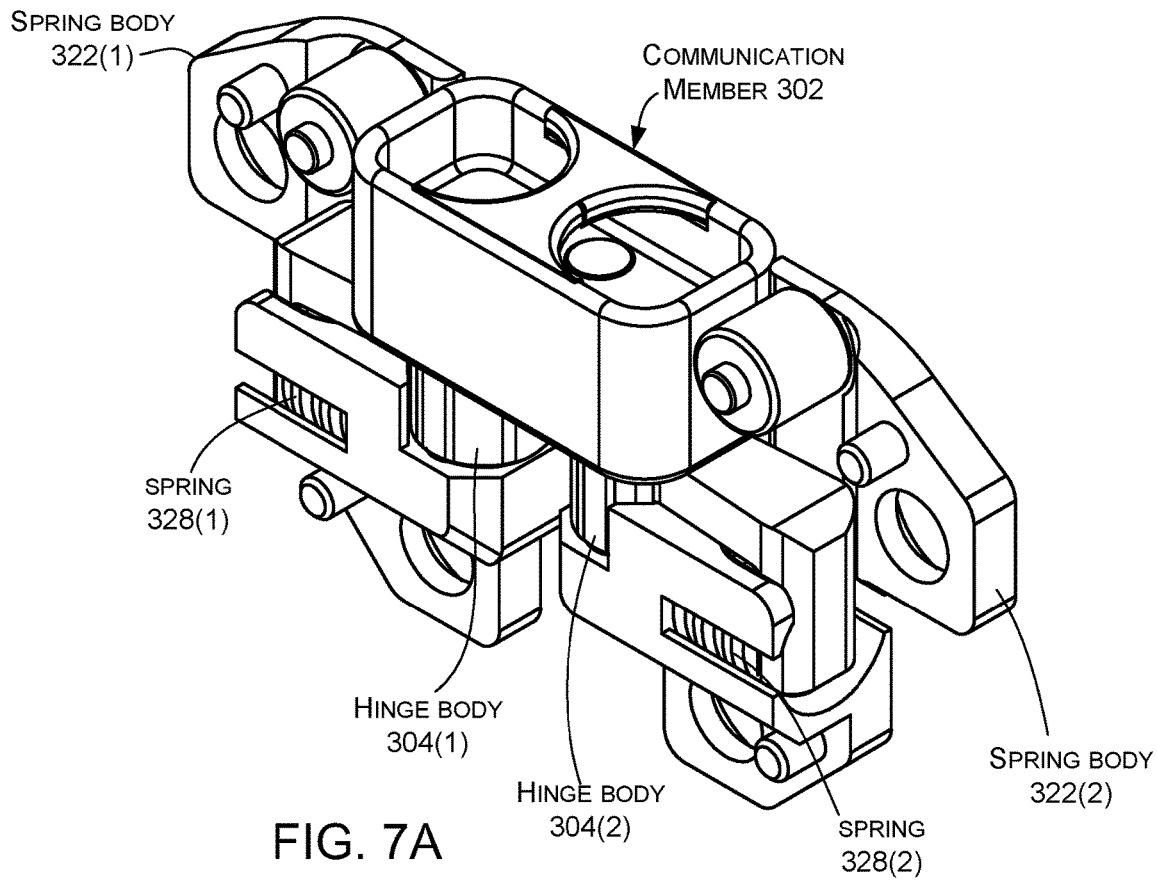
Figure 7B:
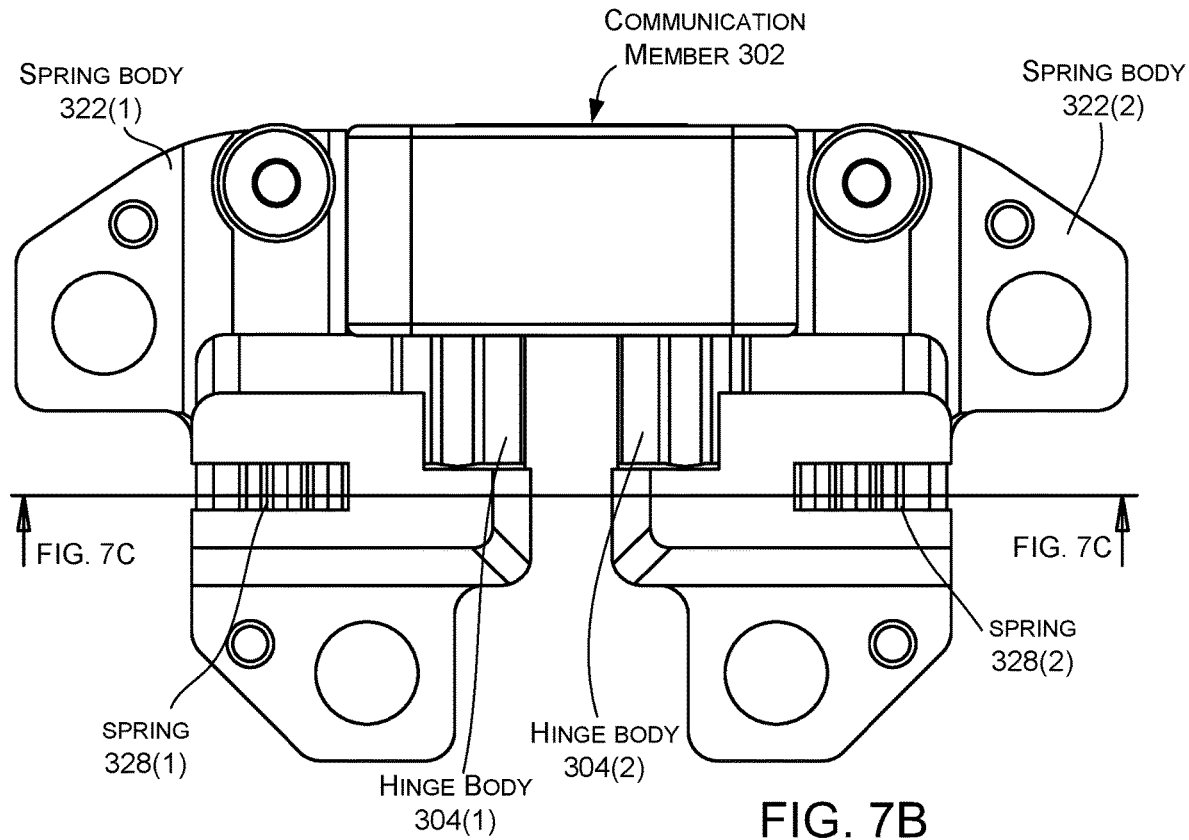
Figure 7C:
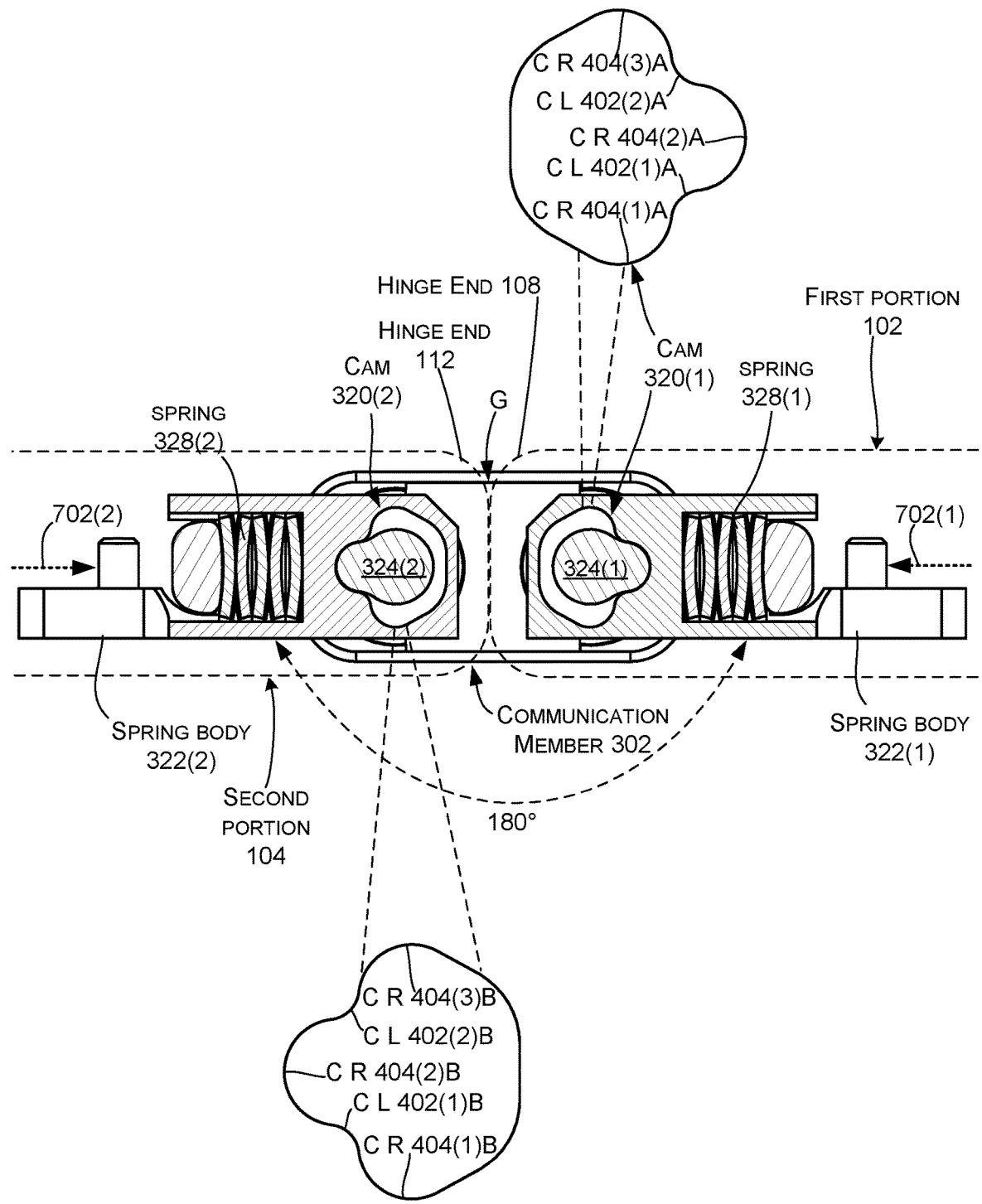
Figure 8A:
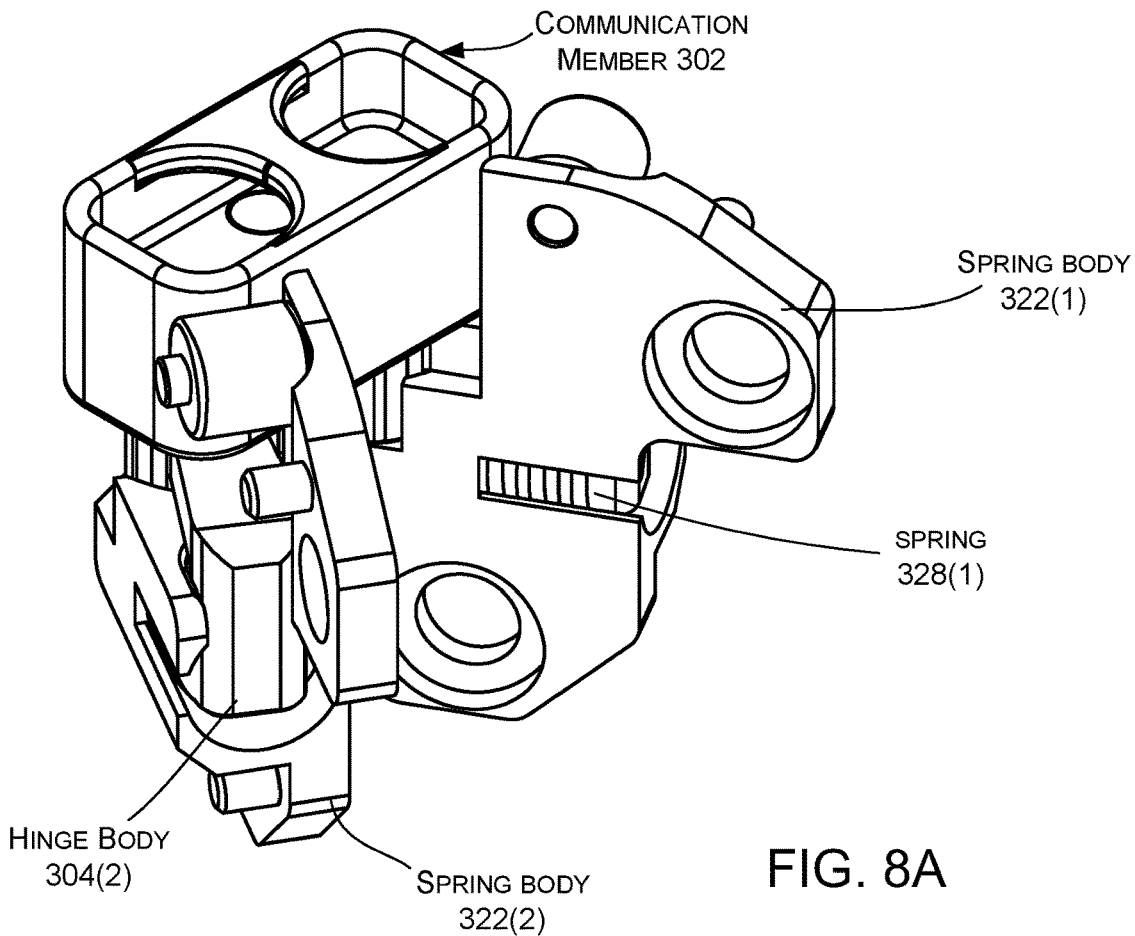
Figure 8B:
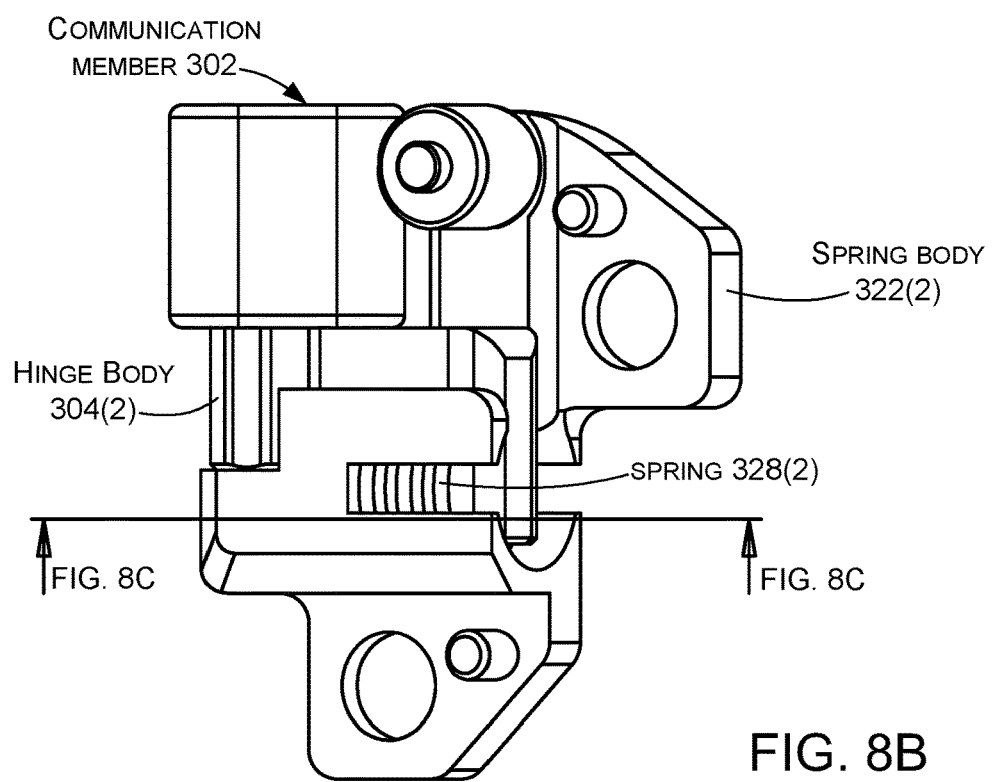
Figure 8C:
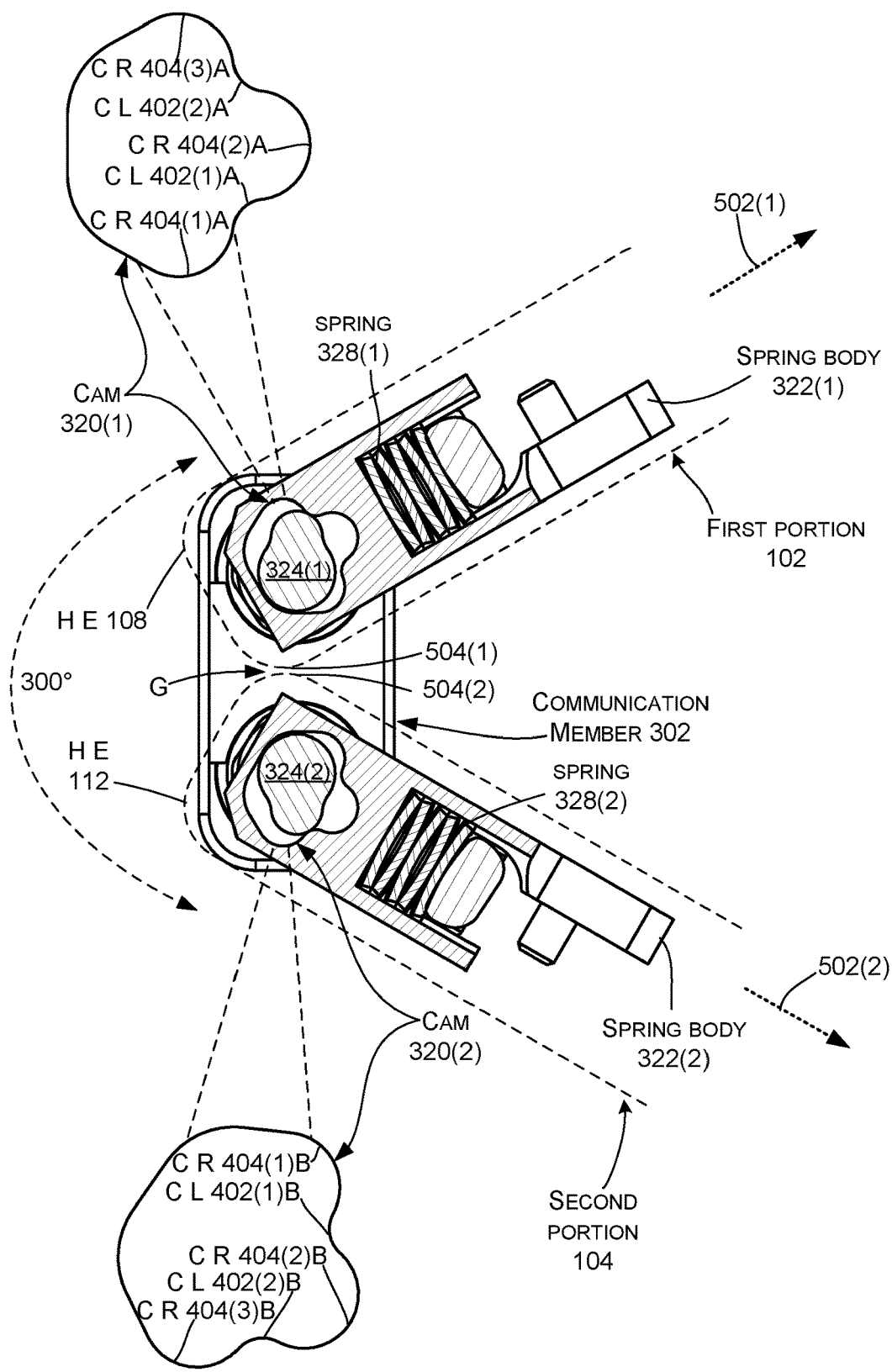
Figure 9A:
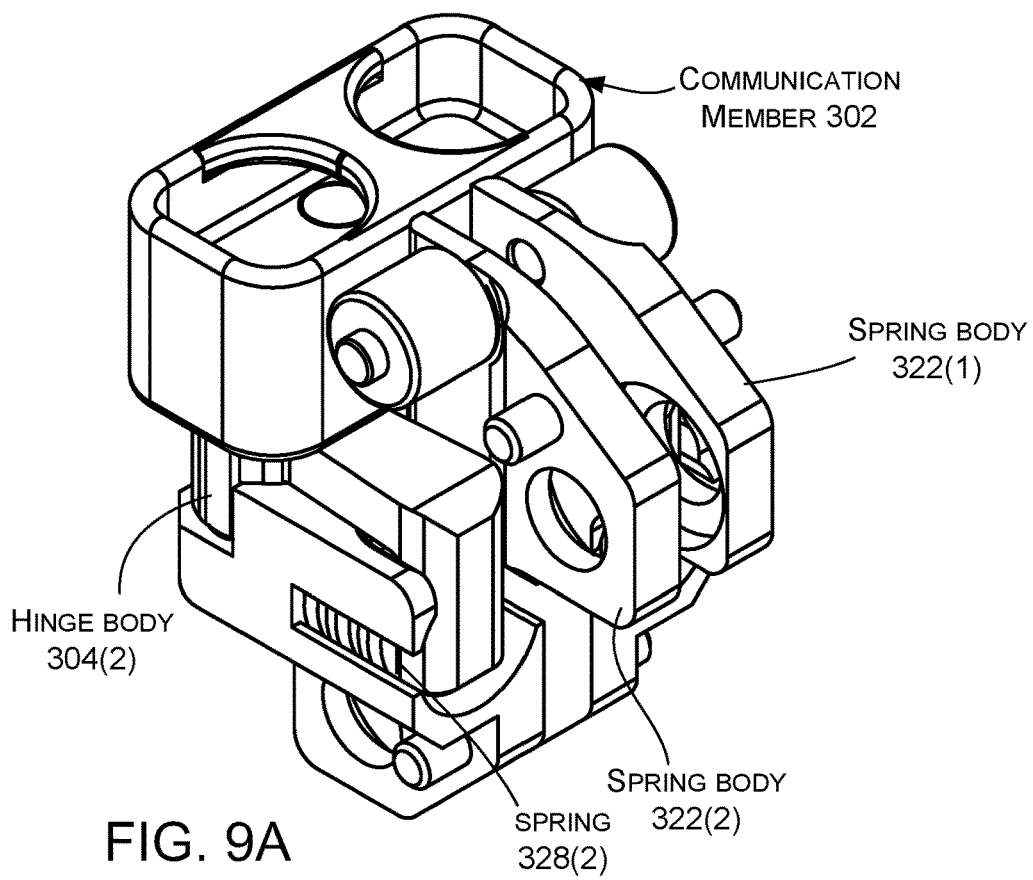
Figure 9B:
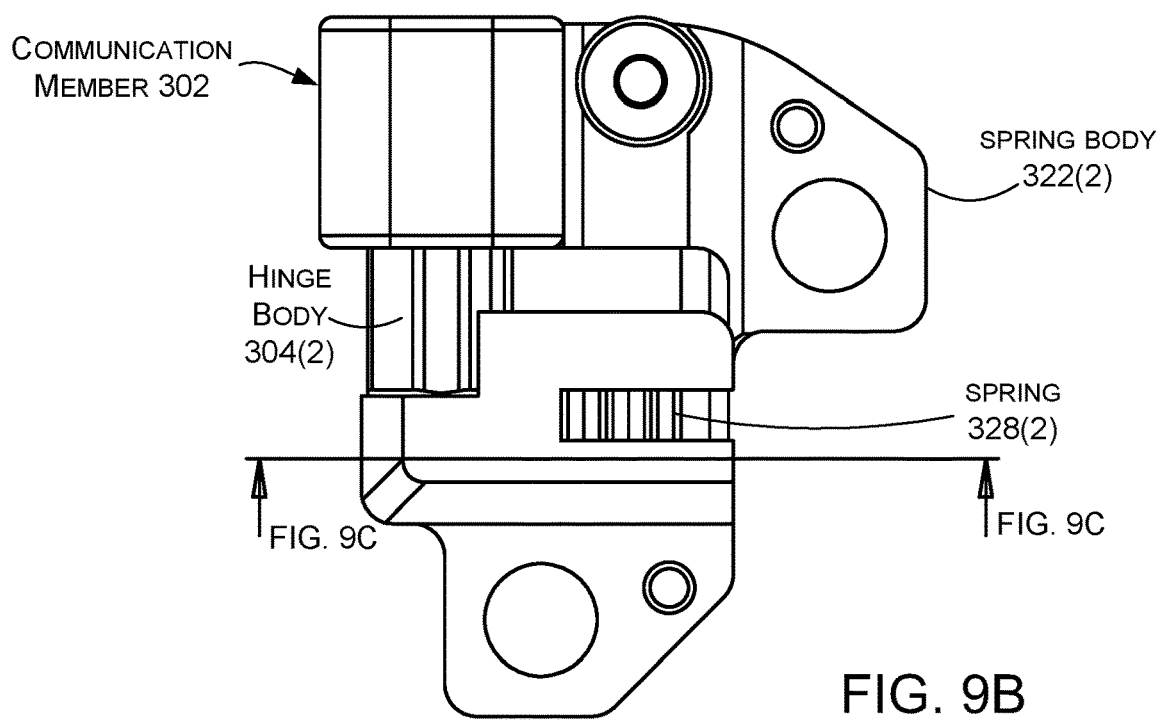
Figure 9C:
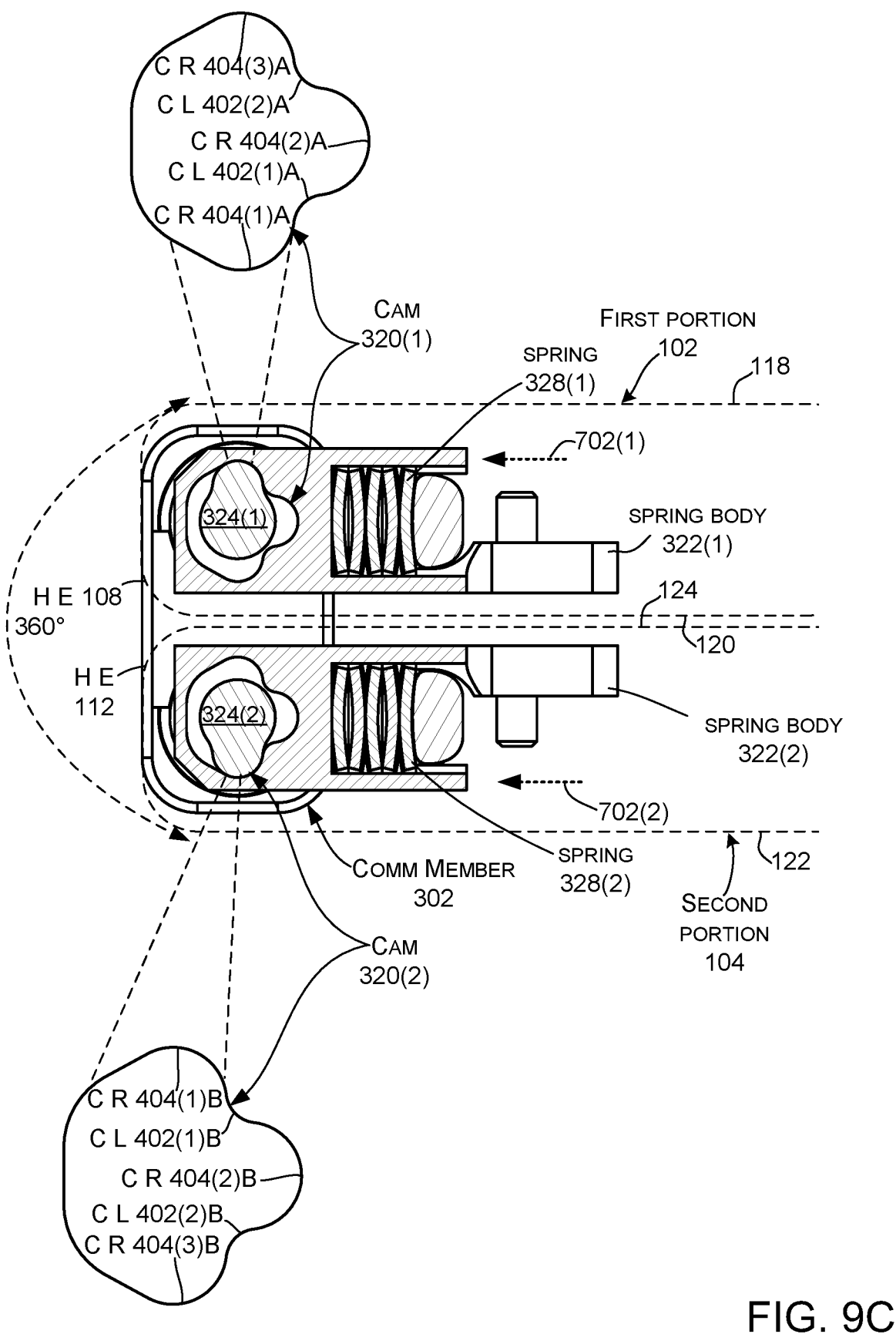

FIGS. 4A-4C show the first and second portions 102 and 104 (e.g., the spring bodies 322(1) and 322(2)) parallel to one another at a zero-degree orientation similar to FIG. 2A with the first surfaces 118 and 122 facing inwardly and the second surfaces 120 and 124 facing outwardly. FIG. 4A is a perspective view, FIG. 4B is a side elevational view (e.g., parallel to the hinge axes 116), and FIG. 4C is a bottom elevational view (e.g., along the hinge axes). FIGS. 5A-5C are similar views to FIGS. 4A-4C at a 45-degree orientation rather than a zero-degree orientation. FIGS. 6A-6C show a 90-degree orientation between the spring bodies 322(1) and 322(2). Similarly, FIGS. 7A-7C are similar views at 180-degree (e.g. parallel) orientations. FIGS. 8A-8C are similar views at 300-degree orientations. FIGS. 9A-9C are similar views at 360-degree orientations (e.g., parallel to and positioned over one another, but in this case, opposite sides of the spring bodies are facing one another when compared to FIGS. 4A-4C).

Looking at FIG. 4C, multi-lobe cams 320 are shown in enlarged form so that details can be more readily visualized. In this case, multi-lobe cams can include two or more cam lobes 402 and cam recesses 404. In the illustrated implementation, the cam lobes 402(1) and 402(2) are interposed between cam recesses 404(1) and 404(3) and cam recess 404(2) is interposed between the cam lobes 402(1) and 402(2) to form a clover-leaf configuration (e.g., viewed together, the inwardly facing surfaces including cam lobes 402 and cam recesses 404 can approximate a clover-leaf shape). Stated another way, the multi-lobe cam can be manifest as a cavity that has a shape that can be viewed as an impression formed by a cloverleaf into the spring bodies 322. (The suffix 'A' is used in association with multi-lobe cam 320(1) and the suffix 'B' is used in association with multi-lobe cam 320(2)). Also in the illustrated implementation, the multi-lobe cams 320 are symmetric relative to a plane that is parallel to the x and z reference axes and passes through cam recess 404(2) (e.g., the multi-lobe cams are bilaterally symmetrical). Other numbers of cam lobes, cam recesses, cam lobe shapes, and/or relative orientations of cam lobes and cam recesses are contemplated.

In the zero-degree orientation of FIGS. 4A-4C, cam follower 324(1) is positioned in cam recess 404(1)A and cam follower 324(2) is positioned in cam recess 404(1)B which allows springs 328 to bias spring bodies 322 toward hinge axes 116. Recall that the spring bodies 322 are fixedly secured to the first and second portions 102 and 104 so the springs also bias the first and second portions 102 and 104 toward the hinge axes 116(1) and 116(2), respectively. The hinge axes 116 are defined by the hinge pins 316 of the communication member 302. The hinge bodies 304 rotate around the hinge pins 316 but maintain a constant distance. Thus, the springs 328 positioned between the hinge bodies 304 and the spring bodies 322 bias the spring bodies and hence bias the first and second portions 102 and 104 toward the hinge axes 116(1) and 116(2), respectively. The multi-lobe cams 320 can overcome this bias in specific orientations to force the first and second portions away from the hinge axes as is discussed below.

FIGS. 5A-5C show self-spacing hinge assembly 106(1) where the first and second portions 102 and 104 have been rotated 45 degrees apart relative to the zero-degree orientation of FIGS. 4A-4C. Note also, that in the illustrated implementation both portions rotate equally (e.g., in this case each portion rotates 22.5 degrees of the 45 total degrees) due to the interactions of primary gears 306 and secondary gears 308. At this point cam lobes 402(1) are engaging cam followers 324 thereby forcing the spring bodies 322(1) and 322(2) away from respective hinge axes 116(1) and 116(2). As mentioned above, the spring bodies 322(1) and 322(2) are fastened to the first and second portions 102 and 104, so forcing the spring bodies away from the hinge axes forces the first and second portions 102 and 104 away from the respective hinge axes 116(1) and 116(2) as represented by arrows 502(1) and 502(2). Forcing the first and second portions away from the hinge axes can provide or maintain a space or gap G between opposing regions of the first and second portions 102 and 104. Forcing the first and second portions away from the hinge axes can reduce and/or eliminate contact between the device portions which would otherwise occur on the hinge ends 108 and 112 of the first and second portions (e.g., inwardly facing regions 504) as indicated in FIG. 5C. Reducing and/or eliminating this contact can prevent damage to these inwardly facing regions. For instance, displays on these regions could easily crack, chip, and/or be otherwise damaged if exposed to forces of the contact. The present implementations can protect these displays from damage.

FIGS. 6A-6C show the first and second portions 102 and 104 rotated to a 90-degree orientation with the portions rotating equivalent amounts (e.g., 45 degrees). At this orientation, the first and second portions are positioned perpendicular to one another. At this orientation, cam lobes 402(1) can exert their greatest 'lift'. Recall that the cam follower 324 is positionally fixed relative to the hinge axes 116 and as a result the lift forces the spring bodies 322 against the springs 328 (e.g., cam follower 324(1) is positionally fixed relative to the hinge axes 116(1) and as a result the lift forces the spring body 322(1) against the spring 328(1), and cam follower 324(2) is positionally fixed relative to the hinge axes 116(2) and as a result the lift forces the spring body 322(2) against the spring 328(2)). The lift force compresses the springs and moves the spring bodies and the first and second portions away from the hinge axes as represented by arrows 502. This movement maintains gap G and prevents damage to regions 504.

FIGS. 7A-7C show the first and second portions 102 and 104 rotated to a 180-degree orientation. At this orientation, the first and second portions are positioned side-by-side with hinge ends abutting one another. As mentioned in the discussion above relative to FIG. 2C, in this 180-degree orientation, displays on the first and second portions can be operated cooperatively to simulate a single larger display. In such a scenario, it can be desirable for the first and second portions to be close to one another and even touching one another to create a nearly seamless collective display. Toward this end, in this case, cam followers 324 are now positioned in cam recesses 404(2). This allows springs 328 to bias the spring bodies 322 and hence the first and second portions toward one another as indicated by arrows 702(1) and 702(2). The first and second portions being biased toward one another, and potentially against one another, can reduce any gap G between the first and second portions that diminishes the user experience provided by the simulated collective display. Note at this orientation, gap G may be present or the first and second portions may be abutting one another, but in either case, the first and second portions are not likely to damage one another like they were at oblique and perpendicular orientations.

FIGS. 8A-8C show a 300-degree orientation of self-spacing hinge assembly 106(1) where the first and second portions 102 and 104 have been rotated 300 degrees apart relative to the zero-degree orientation of FIGS. 4A-4C. At this point cam lobes 402(2) are engaging cam followers 324 thereby forcing the spring bodies 322(1) and 322(2) away from respective hinge axes 116(1) and 116(2). As mentioned above, the spring bodies 322(1) and 322(2) are fastened to the first and second portions 102 and 104, so forcing the spring bodies away from the hinge axes forces the first and second portions 102 and 104 away from the respective hinge axes 116(1) and 116(2) as represented by arrows 502(1) and 502(2). Forcing the first and second portions away from the hinge axes can provide or maintain gap G between opposing regions 504 of the first and second portions 102 and 104. Forcing the first and second portions away from the hinge axes can reduce and/or eliminate contact between the device portions which would otherwise occur on the hinge ends 108 and 112 of the first and second portions 102 and 104 (e.g., the inwardly facing regions 504 of the first and second portions) as indicated in FIG. 8C.

FIGS. 9A-9C show a 360-degree orientation of self-spacing hinge assembly 106(1). The 360-degree orientation is similar to the zero-degree orientation of FIGS. 4A-4C except that second surfaces 120 and 124 are facing inwardly toward one another and first surfaces 118 and 122 are facing outwardly. At this orientation, the cam followers 324 are in cam recesses 404(3), which allows springs 328 to bias the spring bodies 322 and the first and second portions 102 and 104 toward the hinge axes 116(1) and 116(2), respectively, as indicated by arrows 702.

Note that representative orientations are illustrated. Generally, the multi-lobe cams 320 force the first and second portions 102 and 104 apart (e.g. away from the hinge axes)

during oblique and right angles and let the first and second portions be biased toward one another (e.g., toward the hinge axes) at other angles where the first and second portions are parallel to one another. For instance, starting at the zero-degree orientation of FIGS. 4A-4C where the first and second portions are parallel to one another, the multi-lobe cams allow the springs to bias the first and second portions toward the hinge axes. As rotation starts, so too can the camming action. In this case, the extent of the camming action increases as rotation continues through 45 (FIGS. 5A-5C) to 90 degrees (FIGS. 6A-6C) and then can begin to decrease as rotation continues to 180 degrees (FIGS. 7A-7C). The camming starts again at 180 degrees and continues through the illustrated 300-degree view of FIGS. 8A-8C and gradually decreases approaching the 360-degree orientation (FIGS. 9A-9C). Stated another way, camming may not occur at the parallel orientations of zero degrees, 180 degrees, and/or 360 degrees but can occur in at least some of the intervening angles/orientations. The extent of the cam lift, the shape of the cam lift, and/or the duration (e.g., number of degrees) of the cam lift can be determined by the cam profile of the multi-lobe cams to reduce or minimize damage to the first and second portions from contact forces.

Individual elements of the self-spacing hinge assembly 106 can be made from various materials, such as metals, plastics, and/or composites. These materials can be prepared in various ways, such as in the form of sheet metals, die cast metals, machined metals, 3D printed materials, molded or 3D printed plastics, and/or molded or 3D printed composites, among others, or any combination of these materials and/or preparations can be employed.

The present hinge assembly concepts can be utilized with any type of device, such as but not limited to notebook computers, smart phones, wearable smart devices, tablets, and/or other types of existing, developing, and/or yet to be developed devices.

Various methods of manufacture, assembly, and/or use for hinge assemblies and devices are contemplated beyond those shown above relative to FIGS. 1-9C.

Although techniques, methods, devices, systems, etc., pertaining to hinge assemblies are described in language specific to structural features and/or methodological acts, it is to be understood that the subject matter defined in the appended claims is not limited to the specific features or acts described. Rather, the specific features and acts are disclosed as example forms of implementing the claimed methods, devices, systems, etc.

Various device examples are described above. Additional examples are described below. One example includes a device comprising a first portion and a second portion and a self-spacing hinge assembly rotatably securing hinge ends of the first and second portions around a first hinge axis associated with the first portion, and a second hinge axis associated with the second portion so that an extent of rotation around the first hinge axis corresponds to an extent of rotation around the second hinge axis. The self-spacing hinge assembly comprises a communication member that defines first and second hinge pins. The first hinge pin defines the first hinge axis and includes a first cam follower that is orthogonal to the first hinge axis, and further includes a first multi-lobe cam defined relative to the first portion and a first biasing element that biases the first portion toward the first hinge axis unless acted upon by the first multi-lobe cam.

Another example can include any of the above and/or below examples where the first multi-lobe cam comprises alternating cam lobes and cam recesses, and at non-parallel orientations of the first and second portions, individual cam lobes of the first multi-lobe cam engage the first cam follower and overcome the first biasing element and force the first portion away from the first hinge axis to increase space between the first and second portions. At parallel orientations, the first cam follower engages individual cam recesses of the first multi-lobe cam, and the first biasing element biases the first portion toward the first hinge axis and decreases the space between the first and second portions.

Another example can include any of the above and/or below examples where the parallel orientations comprise zero degrees, 180 degrees, and/or 360 degrees.

Another example can include any of the above and/or below examples where the device further comprises a first spring body that is fixedly secured to the first portion and where the first multi-lobe cam is defined by the first spring body, or wherein the first multi-lobe cam is attached to the first spring body.

Another example can include any of the above and/or below examples where the first multi-lobe cam is defined in the first spring body.

Another example can include any of the above and/or below examples where the first hinge pin is received in a first hinge body and the device further comprises a biasing element that can bias the first spring body away from the first hinge body and toward the first hinge axis.

Another example can include any of the above and/or below examples where the bias of the first biasing element is overcome when the first cam follower engages an individual cam lobe of the multi-lobe cam.

Another example can include any of the above and/or below examples where the device further comprises the second hinge pin defining the second hinge axis. The device further comprises the second hinge pin defining the second hinge axis and including a second cam follower that is orthogonal to the second hinge axis. The device can include a second multi-lobe cam defined relative to the second portion, and a second biasing element that biases the second portion toward the second hinge axis unless acted upon by the second multi-lobe cam.

Another example can include any of the above and/or below examples where the first and second hinge pins each include primary gears that provide timing of the self-spacing hinge assemblies so that the extent of rotation around the first hinge axis corresponds to the extent of rotation around the second hinge axis.

Another example can include any of the above and/or below examples where the primary gears directly engage to provide the timing.

Another example can include any of the above and/or below examples where the device further comprises intervening secondary gears and where the primary gears indirectly engage via the intervening secondary gears to provide the timing.

Another example can include any of the above and/or below examples where the first portion comprises a first display and where the second portion comprises a second display.

Another example can include any of the above and/or below examples where the first biasing element comprises a first spring that is oriented orthogonally to the first hinge axis, and a second biasing element comprises a second spring that is oriented orthogonally to a second hinge axis.

Another example can include any of the above and/or below examples where the first multi-lobe cam is bilaterally symmetrical.

Another example can include a device comprising a first portion and a second portion, and further comprising a communication member spanning between the first and second portions and defining first and second parallel hinge pins. The first hinge pin includes a first cam follower that is received in a first multi-lobe cam of the first portion that forces the first portion away from the first hinge pin when the first and second portions are oriented at non-parallel orientations and allows the first portion to be biased toward the second hinge pin at parallel orientations.

Another example can include any of the above and/or below examples where the second hinge pin includes a second cam follower that is received in a second multi-lobe cam of the second portion that forces the second portion away from the second hinge pin when the first and second portions are oriented at non-parallel orientations and allows the second portion to be biased toward the second hinge pin at parallel orientations.

Another example can include any of the above and/or below examples where the communication member includes a timing element that causes equal rotation by the first and second portions.

Another example can include any of the above and/or below examples where the timing element comprises gears.

Another example can include a device comprising a first portion that includes a first display, a second portion that includes a second display, and a self-spacing hinge assembly rotatably securing first and second hinge ends of the first and second portions around first and second hinge axes. The first and second portions define multi-lobe cams that force the first and second portions away from the first and second hinge axes at non-parallel orientations of the first and second portions and allow the first and second portions to be biased toward the first and second hinge axes at parallel orientations of the first and second portions.

Another example can include any of the above and/or below examples where the multi-lobe cams are formed in the first and second portions.

Another example can include any of the above and/or below examples where the self-spacing hinge assembly further comprises a cam follower that is received in the multi-lobe cams formed in the first and/or second portions.

The invention claimed is:

1. A device, comprising:
    a first portion and a second portion;
    a self-spacing hinge assembly rotatably securing hinge ends of the first and second portions around a first hinge axis associated with the first portion and a second hinge axis associated with the second portion so that an extent of rotation around the first hinge axis corresponds to an extent of rotation around the second hinge axis;
    the self-spacing hinge assembly comprising a communication member that defines first and second hinge pins;
    the first hinge pin defining the first hinge axis and including a first cam follower that is orthogonal to the first hinge axis;
    a first multi-lobe cam defined relative to the first portion; and,
    a first biasing element that biases the first portion toward the first hinge axis unless acted upon by the first multi-lobe cam.

2. The device of claim 1, wherein the first multi-lobe cam comprises alternating cam lobes and cam recesses, and at non-parallel orientations of the first and second portions, individual cam lobes of the first multi-lobe cam engage the first cam follower and overcome the first biasing element and force the first portion away from the first hinge axis to increase space between the first and second portions and at parallel orientations the first cam follower engages individual cam recesses of the first multi-lobe cam and the first biasing element biases the first portion toward the first hinge axis and decreases the space between the first and second portions.

3. The device of claim 2, wherein the parallel orientations comprise zero degrees, 180 degrees, and/or 360 degrees.

4. The device of claim 2, further comprising a first spring body that is fixedly secured to the first portion and wherein the first multi-lobe cam is defined by the first spring body.

5. The device of claim 4, wherein the first multi-lobe cam is defined in the first spring body.

6. The device of claim 5, wherein the first hinge pin is received in a first hinge body and wherein the first biasing element biases the first spring body away from the first hinge body and toward the first hinge axis.

7. The device of claim 1, wherein the bias of the first biasing element is overcome when the first cam follower engages an individual cam lobe of the multi-lobe cam.

8. The device of claim 1, further comprising the second hinge pin defining the second hinge axis and comprising:
    the second hinge pin defining the second hinge axis and including a second cam follower that is orthogonal to the second hinge axis;
    a second multi-lobe cam defined relative to the second portion; and,
    a second biasing element that biases the second portion toward the second hinge axis unless acted upon by the second multi-lobe cam.

9. The device of claim 1, wherein the first and second hinge pins each include primary gears that provide timing of the self-spacing hinge assemblies so that the extent of rotation around the first hinge axis corresponds to the extent of rotation around the second hinge axis.

10. The device of claim 9, wherein the primary gears directly engage to provide the timing.

11. The device of claim 9, further comprising intervening secondary gears and wherein the primary gears indirectly engage via the intervening secondary gears to provide the timing.

12. The device of claim 1, wherein the first portion comprises a first display and wherein the second portion comprises a second display.

13. The device of claim 1, wherein the first biasing element comprises a first spring that is oriented orthogonally to the first hinge axis and a second biasing element comprises a second spring that is oriented orthogonally to the second hinge axis.

14. The device of claim 1, wherein the first multi-lobe cam is bilaterally symmetrical.

15. A device, comprising:
    a first portion and a second portion; and,
    a communication member spanning between the first and second portions and defining first and second parallel hinge pins, the first hinge pin including a first cam follower that is received in a first multi-lobe cam of the first portion that forces the first portion away from the first hinge pin when the first and second portions are oriented at non-parallel orientations, and a first biasing element that biases the first portion toward the first hinge pin at parallel orientations.

16. The device of claim 15, wherein the second hinge pin includes a second cam follower that is received in a second multi-lobe cam of the second portion that forces the second portion away from the second hinge pin when the first and second portions are oriented at non-parallel orientations, and a second biasing element that biases the second portion toward the second hinge pin at parallel orientations.

17. The device of claim 16, wherein the communication member includes a timing element that causes equal rotation by the first and second portions.

18. The device of claim 17, wherein the timing element comprises gears.

19. A device, comprising:
   a first portion that includes a first display;
   a second portion that includes a second display; and,
   a self-spacing hinge assembly rotatably securing first and second hinge ends of the first and second portions around first and second hinge axes, the first and second portions defining multi-lobe cams that interact with cam followers to force the first and second portions away from the first and second hinge axes at non-parallel orientations of the first and second portions and allow the first and second portions to be biased toward the first and second hinge axes at parallel orientations of the first and second portions according to force applied by biasing elements.

20. The device of claim 19, wherein the multi-lobe cams are formed in the first and second portions.

\* \* \* \* \*